United States Patent
van Rensburg et al.

(10) Patent No.: US 8,379,592 B2
(45) Date of Patent: *Feb. 19, 2013

(54) SYSTEM AND METHOD FOR COORDINATING ELECTRONIC DEVICES IN A WIRELESS COMMUNICATIONS SYSTEM

(75) Inventors: Cornelius van Rensburg, Wylie, TX (US); Oghenekome Oteri, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 384 days.

This patent is subject to a terminal disclaimer.

(21) Appl. No.: 12/769,498

(22) Filed: Apr. 28, 2010

(65) Prior Publication Data

US 2010/0273499 A1    Oct. 28, 2010

Related U.S. Application Data

(60) Provisional application No. 61/173,404, filed on Apr. 28, 2009, provisional application No. 61/222,000, filed on Jun. 30, 2009.

(51) Int. Cl.
*H04W 4/00* (2009.01)
(52) U.S. Cl. ........................................ 370/330
(58) Field of Classification Search .................. 455/450, 455/521, 509, 404.1, 69, 434, 574, 561, 562.1; 370/252, 336, 342, 203, 329, 550.1, 368, 370/330; 342/368
See application file for complete search history.

(56) References Cited

U.S. PATENT DOCUMENTS

| | | | |
|---|---|---|---|
| 7,274,330 B2 | 9/2007 | Lee | |
| 7,274,936 B2 | 9/2007 | Zangi et al. | |
| 7,373,176 B2 | 5/2008 | Chotkowski et al. | |
| 8,041,313 B2 | 10/2011 | Van Rensburg et al. | |
| 2004/0224637 A1 | 11/2004 | Silva et al. | |
| 2005/0014540 A1 | 1/2005 | Shim | |
| 2005/0070331 A1 | 3/2005 | Higuchi et al. | |
| 2006/0203789 A1 | 9/2006 | Iacono et al. | |
| 2007/0207838 A1 | 9/2007 | Kuwahara et al. | |
| 2008/0020715 A1 | 1/2008 | Zangi et al. | |
| 2008/0075033 A1 | 3/2008 | Shattil | |
| 2008/0232492 A1 | 9/2008 | Xiao et al. | |
| 2009/0147869 A1 | 6/2009 | Duan et al. | |
| 2009/0253387 A1 | 10/2009 | Van Rensburg et al. | |
| 2010/0177725 A1 | 7/2010 | van Rensburg | |

FOREIGN PATENT DOCUMENTS

| | | |
|---|---|---|
| CN | 1551519 | 12/2004 |
| WO | WO2007/023515 | 3/2007 |
| WO | WO 2009/040679 A2 | 4/2009 |

OTHER PUBLICATIONS

European Search Report, Application No. 09815383.6-2411/2311192, Applicant: Huawei Technologies Co., Ltd., Jul. 20, 2011, 8 pages.

(Continued)

*Primary Examiner* — Melody Mehrpour
(74) *Attorney, Agent, or Firm* — Slater & Matsil, L.L.P.

(57) ABSTRACT

A system and method for coordinating electronic devices in a wireless communications system are provided. A method for transmitting information by a controller includes computing a beam cycle based on transmissions from a plurality of mobile devices, receiving resource-specific channel quality indicators from the plurality of mobile devices, scheduling a transmission opportunity for a mobile device in the plurality of mobile devices, and transmitting information to the mobile device based on the scheduled transmission opportunity. The mobile devices are being served by the controller, and the scheduling is based on the beam cycle and the channel quality indicators.

33 Claims, 14 Drawing Sheets

OTHER PUBLICATIONS

Written Opinion and International Search Report, International Application No. PCT/US09/57837, Applicant: Futurewei Technologies, Inc., Nov. 20, 2009, 6 pages.

Thiele, L., et al., "Capacity Scaling of Multi-User MIMO with Limited Feedback in a Multi-Cell Environment," IEEE, 2007, 8 pages.

Nokia, "New UTRAN Measurement for RRM support of beamforming," 3GPP TSG RAN #21 meeting, Tdoc R1-01-0824, Aug. 27-31, 2001, 6 pages, Turin, Italy.

Baumgartner, T. et a., "Performance of Downlink Beam Switching for UMTS FDD in the Presence of Angular Spread," IEEE International Conference on Communications (ICC 2002), vol. 2, Aug. 2002, pp. 851-855.

Liao, W.J., et al., "A Novel Beam Switching Antenna Using RF Switches," IEEE Antennas and Propagation Society International Symposium, IEEE, Honolulu, HI, Jun. 9-15, 2007, pp. 5865-5868.

Love, D.J., "On the Probability of Error of Antenna-Subset Selection with Space-Time Block Codes," IEEE Transactions on Communications, vol. 53, No. 11, Nov. 2005, pp. 1799-1803.

Pedersen, K., et al., "Application and Performance of Downlink Beamforming Techniques in UMTS," IEEE Communications Magazine, vol. 41, No. 10, IEEE Communications Society, Oct. 2003, pp. 134-143.

Sanayei, S., et al., "Antenna Selection in MIMO Systems," IEEE Communications Magazine, vol. 42, No. 10, IEEE Communications Society, Oct. 2004, pp. 68-73.

Zeng, X.N., et al., "Performance Bounds for Space-Time Block Codes with Antenna Selection," International Symposium on Information Theory, ISIT Proceedings, IEEE, Chicago, IL, Jun. 27-Jul. 2, 2004, p. 339.

"Proposals for LTE-Advanced Technologies," 3GPP TSG RAN WG1 Meeting #53bis, R1-0825, Jun. 30-Jul. 4, 2008, NTT DoCoMo, Inc., 37 pages, Warsaw, Poland.

Ericsson, "LTE-Advanced—Coordinated Multipoint Transmission/Reception," TSG-RAN WG1 #53bis, R1-082469, Jun. 30-Jul. 4, 2008, 6 pages, Warsaw, Poland.

Ericsson, "Schedule Single vs. Multiple Beams Per Frame for E-UTRA," 3GPP TSG RAN WG1 Meeting #46, R1-062282, Aug. 28-Sep. 1, 2006, 5 pages, Tallin, Estonia.

Fujishima, K., et al., "Technical Proposal for IMT-Advanced," Hitachi, Ltd., REV-080009, 3GPP TSG RAN IMT-Advanced Workshop, Apr. 7-8, 2008, 23 pages, Shenzhen, China.

Hitachi, Ltd., "Interference Management for Broadband Transmission with Antenna Port 5," 3GPP TSG RAN WG1 #55bis, R1-090068, Jan. 12-16, 2009, pp. 1-3, Ljubljana, Slovenia.

Hosein, P., et al., "On the Performance of Downlink Beamforming with Synchronized Beam Cycles," IEEE, 2009, 5 pages.

Huawei, "DL Coordinated Beam Switching for Interference Management in LTE-Advanced," 3GPP TSG RAN WG1#54, R1-083236, Aug. 18-22, 2008, 6 pages, Jeju, Korea.

Saur, S., et al., "Grid-of-Beams (GoB) Based Downlink Multi-User MIMO," IEEE 802.16 Broadband Wireless Access Working Group, May 5, 2008, pp. 1-4.

Samsung, "Inter-Cell Interference Mitigation Through Limited Coordination," 3GPP TSG RAN WG1 Meeting#54, R1-082886, Aug. 18-22, 2008, 8 pages, Jeju, Korea.

Huawei, "Some results on DL coordinated beam switching for interference management in LTE-Advanced," 3GPP TSG RAN WG1#55, RI-084352, Nov. 10-14, 2008, 7 pages.

Huawei, "DL Coordinated Beam Switching for Interference management in LTE-Advanced," 3GPP TSG RAN WG1#54, R1-083236, Aug. 18-22, 2008, 6 pages.

"Extended European Search Report," Applicatoin No. 10770276.3-1249, Applicant: Huawei Technologies Co., Ltd., Jul. 31, 2012, 7 pages.

"Notification of International Search Report and Written Opinion," International Application No. PCT/US2010/032811, Applicant: van Rensburg, Cornelius, Jul. 14, 2010, 11 pages.

SYSTEM AND METHOD FOR COORDINATING ELECTRONIC DEVICES IN A WIRELESS COMMUNICATIONS SYSTEM

This application claims the benefit of U.S. Provisional Application No. 61/173,404, filed on Apr. 28, 2009, entitled "System and Method for Coordinating Electronic Devices in a Wireless Communications System," and U.S. Provisional Application No. 61/222,000, filed on Jun. 30, 2009, entitled "Communications System with Utility Based Grouped Scheduling," which applications are hereby incorporated herein by reference.

TECHNICAL FIELD

The present invention relates generally to wireless communications, and more particularly to a system and method for coordinating electronic devices in a wireless communications system.

BACKGROUND

During the development of Long Term Evolution (LTE), there was much discussion for the flexibility to customize LTE to maximize performance in specific environments. Also, during discussions of LTE-Advanced (LTE-A), many suggestions were made to manage interference level by using coordinated transmissions from different cells (see Ericsson, R1-082469, "LTE-Advanced—Coordinated Multipoint transmission/reception", Warsaw, Poland, Jun. 30-Jul. 4, 2008). It is well known that as cell size is decreased in an effort to improve spectral efficiency, interference increases.

In general, wireless communications systems using beamforming make use of a number of transmit and/or receive antennas and signal processing to create fixed or adaptive transmit/receive beampatterns. The beampatterns may have a directional nature that may result in a performance improvement when compared with unidirectional transmit and/or receive antennas. The use of the beampatterns may yield a transmit/receive gain over wireless communications systems using unidirectional transmit and/or receive antennas.

As such, beamforming has been promoted as a promising technique to increase cell coverage and to improve cell edge spectral efficiencies. However, one main drawback of beamforming is the so called flashlight effect where the channel quality changes between user equipment (UE) measurement and reporting, and NodeB (NB) transmission, due to the changes in the beampattern of the interfering neighbouring cells. Coordinated beamforming/switching has been suggested as a possible solution to this problem (see C80216m-08_487, Alcatel_Lucent, "Grid-of-Beams (GoB) Based Downlink Multi-User MIMO", IEEE802.16m, May 2008 and NTT DoCoMo, "Proposals for LTE-Advanced technologies", R1-082575, Warsaw, Poland, Jun. 30-Jul. 4, 2008 which are incorporated herein by reference).

What is needed is a system and method for coordinated beam switching where the coordination between cells is limited and typically changes slowly. For example, each NB in a cluster could systematically cycle through its preferred set of beams on antenna port five (5). The cycling patterns may change on a slow basis and may be a function of traffic distribution, wherein the distribution should only change on the order of seconds. This implies that the received signal and interference to noise ratio (SINR) of a slow moving UE may fluctuate deterministically in time as the different NBs cycle through their beams. The reported CQI will therefore be valid at some known time in the future given that the UE is moving slowly relative to the cycling period.

SUMMARY OF THE INVENTION

These and other problems are generally solved or circumvented, and technical advantages are generally achieved, by embodiments of a system and method for allocating beams in time-frequency space enabled coordinate beam switching in a wireless communications system.

In accordance with an embodiment, a method for transmitting information by a controller is provided. The method includes computing a beam cycle based on transmissions from a plurality of mobile devices, receiving resource-specific channel quality indicators from the plurality of mobile devices, scheduling a transmission opportunity for a mobile device in the plurality of mobile devices, and transmitting information to the mobile device based on the scheduled transmission opportunity. The mobile devices are served by the controller, and the scheduling is based on the beam cycle and the channel quality indicators.

In accordance with another embodiment, a method for transmitting information by a controller is provided. The method includes receiving feedback information from mobile devices in a plurality of mobile devices served by the controller, computing a beam cycle based on the feedback information, computing a utility function for each mobile device in the plurality of mobile devices sending feedback information, scheduling a transmission opportunity for a mobile device in the plurality of mobile devices, and transmitting information to the mobile device based on the scheduled transmission opportunity. The scheduling is based on the beam cycle, the feedback information, and the utility function.

In accordance with another embodiment, a method for transmitting information by a controller is provided. The method includes performing channel discovery with a plurality of communications devices served by the controller, computing a beam cycle based on results of the channel discovery, receiving resource-specific channel quality indicators from the plurality of communications devices, scheduling a transmission opportunity for a communications device in the plurality of communications devices, and transmitting information to the communications device based on the scheduled transmission opportunity. The scheduling is based on a selected coordinated beam switching technique, the beam cycle, and the resource-specific channel quality indicators.

An advantage of an embodiment is that control signaling and reference signal overhead may be very small. Therefore, their impact on the overall performance of the communications system is also very small.

A further advantage of an embodiment is that it may be possible to seamlessly and invisibly to the UE, implement a restricted scheduling technique at the NB. Therefore, the UEs may not need to modify their feedback behavior or change the nature of their feedback information.

Yet another advantage of an embodiment is that maximum multi-user diversity gains may be possible, which may significantly improve performance at light load conditions.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1A:
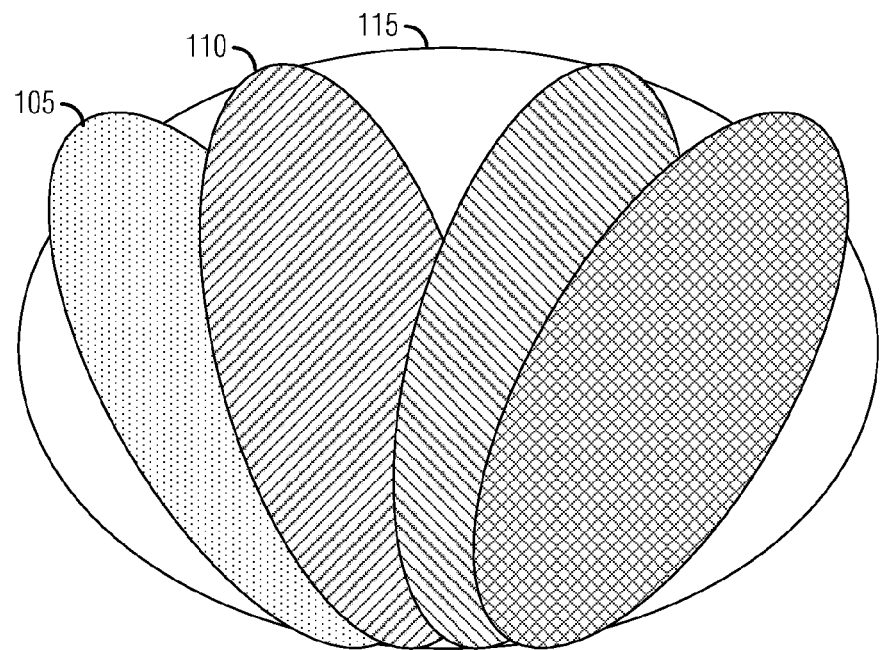
FIG. 1a is a diagram of possible antenna beams from a plurality of antennas.
Figure 1B:
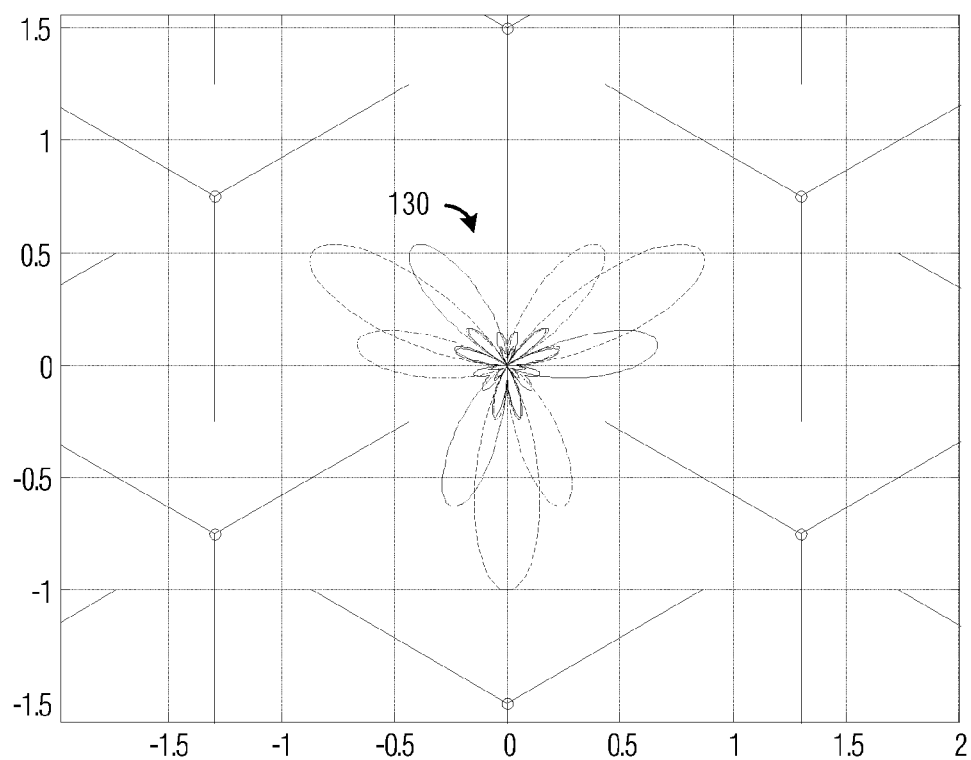
FIG. 1b is a diagram of a typical three-sector cellular communications system.

FIG. 1a illustrates possible antenna beams from a plurality of antennas. As shown in FIG. 1a, there are four directional antenna beams, such as directional antenna beam 105 and directional antenna beam 110, corresponding to different transmission antennas. FIG. 1a also illustrates an omnidirectional beam 115 that may correspond to the use of all antennas in the plurality of antennas to transmit the signal to be transmitted. FIG. 1b illustrates a typical three-sector cellular communications system layout with directional beam patterns at a center cell 130.

Figure 2A:
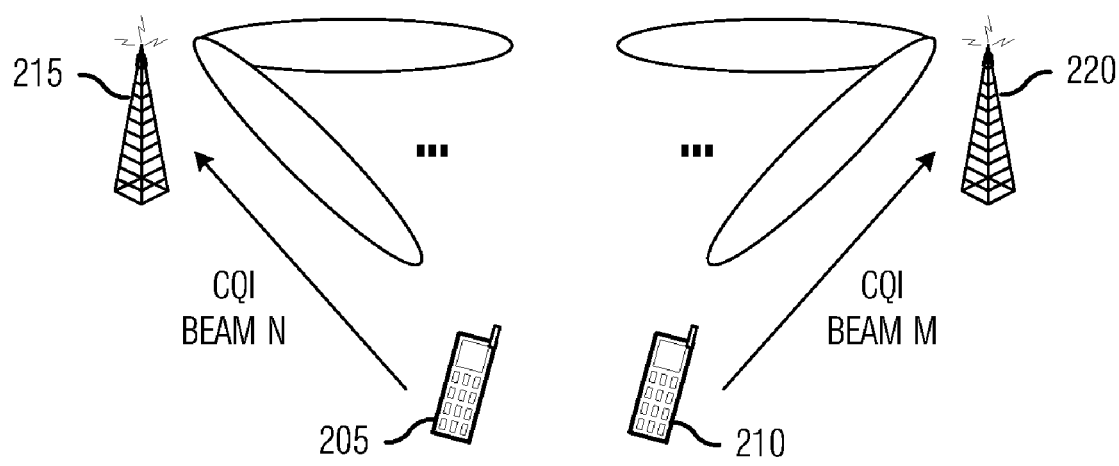
FIG. 2a is a diagram of the operation of two mobile stations in a wireless communications system.

FIG. 2a illustrates the operation of two MS in two adjacent cells. A first MS "MS1" 205 may measure transmissions from a first BS "BS1" 215 and a second MS "MS2" 210 may measure transmissions from a second BS "BS2" 220 to determine the best CQI, which it may report back to its respective BS. The transmissions made by the BSs may be made with different antenna beams at different times. Then, transmissions to the MSs may be made using the slot corresponding to the best CQI reported to the BSs by the MSs.

Figure 2B:
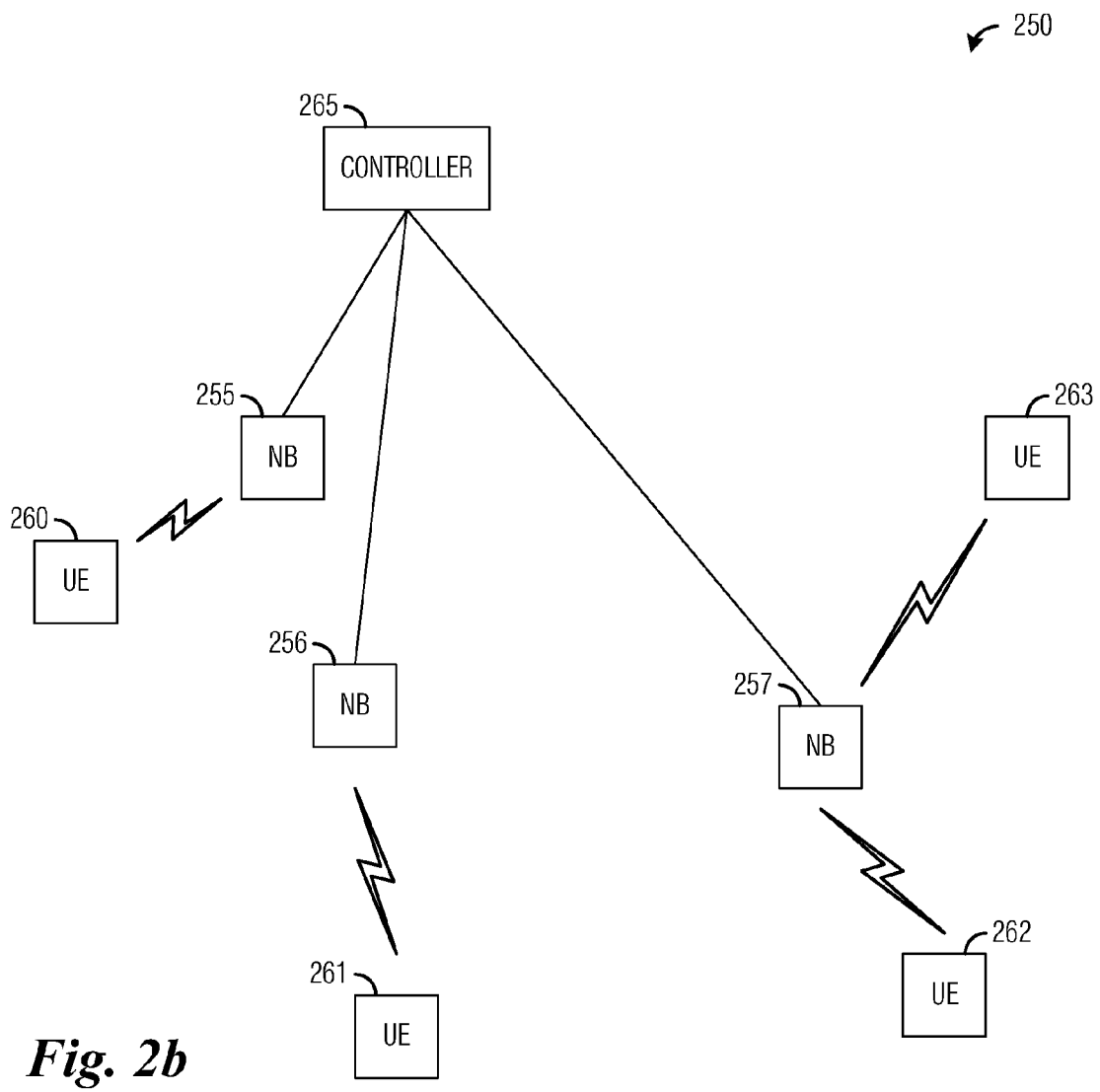
FIG. 2b is a diagram of a wireless communications system.

FIG. 2b illustrates a wireless communications system 250. Wireless communications system 250 includes a number of NBs, such as NB 255, NB 256, and NB 257. Each of the NBs may be responsible for allocating network resources to UEs, such as UE 260, UE 261, UE 262, and UE 263, that it is serving. For example, a NB may forward a transmission intended for a UE that it is serving or allocate some network resources to a UE that it is serving so that the UE may transmit information.

Some or all of the NBs in wireless communications system 250 may be operating in a restricted/grouped PMI scheduling mode. The NBs that are operating in a restricted/grouped PMI scheduling mode may be referred to as being in an inuse subset of all of the NBs since not all NBs are required to participate in restricted/grouped PMI scheduling mode. The NBs that are operating in a restricted/grouped PMI scheduling mode may each transmit pilots. The NBs may then receive preferred PMIs from the UEs that it is serving. The PMIs received from the UEs may be used with or without coordination with other NBs to schedule transmissions to the UEs.

In a situation when not all of the NBs in wireless communications system 250 is operating in a restricted/grouped PMI scheduling mode, then if the NB has a neighboring NB that is not operating in a restricted/grouped PMI scheduling mode (for example, the neighboring NB may be operating in spatial multiplexing or transmit diversity modes), then the CQI measurements made by UEs of the NB may be impacted by transmissions made by the neighboring NB that occur at the same time and frequency as the pilots transmitted by the NB. Furthermore, there may be a situation wherein a portion of the available bandwidth is operating in CBS. As an example, if the channel is a 10 MHz channel with a total of 50 resource blocks, then a portion, e.g., 30 resource blocks may be dedicated to CBS, and a remainder, e.g., 20 resource blocks, may be dedicated to normal operation.

Although each NB or each cell may have a beam group cycling pattern with a different period, there may be a global beam group cycling pattern period for all NBs operating in the restricted/grouped PMI scheduling mode. A controller 265 connected to the NBs may specify the global beam group cycling pattern period based on individual beam group cycling pattern periods from each of the NBs or cells. The global beam group cycling pattern period may be a smallest multiple of all of the individual beam group cycling pattern periods. For example, if three NBs are participating in the restricted/grouped PMI scheduling mode with individual beam group cycling pattern periods of four (4), four (4), and eight (8), respectively, then the global beam group cycling pattern period may be eight (8). Alternatively, the global beam group cycling pattern period may be 16, 24, or so forth.

Figure 2C:
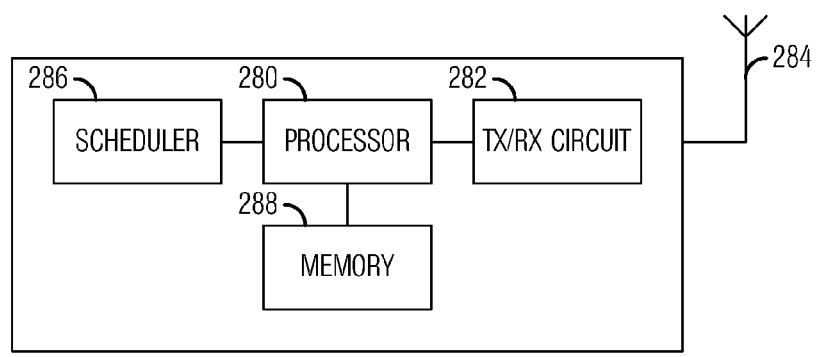
FIG. 2c is a diagram of a NB.

FIG. 2c illustrates a NB 275. NB 275 may control communications to and from UEs that it is serving. NB 275 may operate in several operating modes, including restricted/grouped PMI scheduling, flexible coordination, and so forth. NB 275 includes a processor 280 that may be used to run applications and programs. Processor 280 may also perform coordination with other NBs or a controller for the NBs to determine a beam group cycle pattern. The determining of a beam group cycle pattern is described in greater detail below.

NB 275 also includes a transmit/receive circuit 282 that may be used to process information/data to be transmitted as well as process received information/data. For example, transmit/receive circuit 282 may filter, amplify, error detect, error correct, encode, decode, and so forth, the information/data. The information/data may be received or transmitted by way of an antenna 284. Although shown as a single antenna, antenna 384 may be an antenna array of multiple antennas.

NB 275 further includes a scheduler 286 that may be used to schedule transmissions of information/data to UEs served by NB 275 using beams in beam groups. Scheduler 286 may or may not coordinate its beam groups with neighboring NBs. Scheduler 286 may make use of PMI received from UEs to schedule transmissions to the UEs. Although it may be preferred that scheduler 286 makes use of a UE's preferred beam (a beam corresponding to the PMI sent by the UE), scheduler 286 may instead use an alternate beam within a same beam group as the UE's preferred beam. For example, scheduler 286 may elect to use the alternate beam if more UEs have reported that they prefer the alternate beam.

Scheduler 286 may also make use of a utility function to select UEs for scheduling. The utility function may allow for NB 275 to maximize network utilization by switching from strict coordination to no coordination and different levels of coordination in between. Scheduler 286 may use the utility function to assist in the selection of the UEs and may elect to violate one or more coordination rules based on the utility function. As an example, scheduler 286 may violate a reported PMI or a reported CQI from the UEs or the beam cycle pattern selected by NB 275. Furthermore, scheduler 286 may form different groupings based on the utility function or apply different penalties based on the utility function. A detailed discussion of a formulation of the utility function (based on considerations such as traffic load, variance in reported SINR, UE mobility, UE selection penalty, and so forth) as well as the use of the utility function by scheduler 286 is provided below.

Both scheduler 286 and processor 280 may be coupled together and to a memory 288. Memory 288 may be used to store applications and programs, as well as scheduling data, such as received PMI reports from the UEs served by NB 275. Memory 288 may also be used to store information about which network resources have been assigned to which UEs, as well as beam group cycle information, such as beam group cycle period, beam group cycle pattern, beams, beam groups, codebooks, and so on.

Cell coordination may occur at many levels. At the highest level, a central scheduler has full knowledge of all radio conditions of all UE's in a cluster of cells and tries to find a global optimum selection of UE's to be served at any instant in time. This solution would unfortunately require an excessive overhead on the backhaul, and may be simply impossible to implement if the fundamental delays on the backhaul transmission are considered. This necessitates that a simpler, less optimal solution that would be easier to implement is found. A solution simpler than previously proposed (see NTT DoCoMo, "Proposals for LTE-Advanced technologies", R1-082575, Warsaw, Poland, Jun. 30-Jul. 4, 2008 which is incorporated herein by reference) is proposed herein. Simulation studies show that the proposed solution provides close to optimal performance.

The proposed solution makes use of a new beamforming mode, referred to as "coordinated beam switching mode." In coordinated beam switching, every NB would determine its own cycling pattern, based on a predefined pattern based on its load and user distribution and then communicate this cycling pattern over a backhaul to other NBs in the cluster. This cycling pattern does not need to be communicated to the UEs, only the cycling pattern's period. The coordinated beam switching mode implies that:

- The reference signal (RS) on Antenna port 5 or an equivalent precoded CQI reference signal is always switched on.
- A UE measures CQI based on Antenna port 5 or an equivalent precoded CQI reference signal.
- The NBs in a cluster taking part in the coordination agree and broadcast the period of the beam cycling pattern. For example, a NB with eight (8) antennas may choose a period of eight (8), while a NB with four (4) antennas may select a period of four (4). The cluster period will be determined either by a cluster controller or some function of the reported cell periods such as greatest reported period, namely eight (8).
- A cluster controller determines, based on the reported cycling periods, an optimum cycling period and reports this period back to the individual NBs. The NBs then have to adjust their preferred cycling period to the cluster controller period and broadcast this period to the UEs in the cells.
- In another embodiment, the period is determined by a technical standard or is otherwise prespecified and each NB determines its beam cycling pattern accordingly, and the period does not need to be broadcasted since the UEs will already know this value from the technical standard or from the prespecified value.
- The UE reports the subframe where the maximum CQI was measured in the period, and reports one CQI per period. Alternatively, the UE performs a periodic averaging of the CQI and reports the subframe in the period where the maximum CQI was measured. For example, the CQI reported in subframe x within the period is derived by averaging over subframe x in prior periods.

According to the LTE technical standards, antenna port five (5) is configured as a UE specific RS which is only switched on during data transmission on the physical downlink shared channel (PDSCH). The proposed solution has a mode wherein antenna port five (5) is configured as a cell specific RS which is permanently switched on during this mode. Effectively, the proposed solution effectively uses a precoded CQI reference signal to establish a CQI associated with the specific precoder. The proposed use of antenna port five (5) as a common RS is such that if all NBs in a cluster cycled through a set of predefined beams over a specific period of a certain number of subframes where both the RS and PDSCH use the same beams. This may cause both a predictable beam and interference to a UE. Given that the UE will then measure the CQI directly from the cell specific RS on antenna port five (5), there may be no ambiguity about the CQI as is currently the case with the UE specific RS.

Considering that antenna port five (5) will be activated primarily in correlated fading environments, it is expected that some beams will lead to much better CQI reports than others. In order to reduce the CQI feedback overhead and to avoid feeding back bad CQI's, it is proposed that only good (or only the N best, where N may range from one to a period of the beam cycle) CQI be feedback within a certain period, which will be a fixed (or slowly varying) value within a cluster of cells.

Advantages of the proposed solution include:

The UE does not need to perform a channel estimate on an interfering cell.

The UE does not need to report a preferred PMI nor a preferred interferer PMI.

The CQI calculated is a function of the complete interference environment, not only based on the strongest interferer.

The UE does not need to know the configuration of the other NBs in the cluster. For example, some NBs could have different numbers of antennas, and different configurations. Some NBs may not even participate in the coordination and the UE does not need to know that. If a neighboring NB has an uncorrelated antenna configuration, and does not operate in the coordinate beam switching mode (it may perform spatial multiplexing or transmit diversity), then the CQI will be a function of the data transmitted in the REs where the antenna port 5 RS would normally be.

In order to efficiently implement a coordinated beam switching system, a time-frequency beam allocation method may be used. LTE has an OFDMA signal structure on the downlink, which means that the there is a frequency domain component that may be exploited. Given that the current LTE reference may be able to do frequency domain subband scheduling (in addition to time domain subframe scheduling), and therefore obtain multi-user diversity gains on a subband level, similar gains need to be achieved with coordinated beam switching.

Furthermore, as discussed previously, the importance of selecting the shortest possible cycle length in order to reduce the scheduling delay must be stressed. Given that in OFDMA, it is possible to cycle in both time and frequency, there is more flexibility to choose longer cycle lengths (which are shorter in time) which may more accurately reflect the per beam loading, as well as provides the necessary interference diversity.

Additionally, a specific beam should be placed on a subband where the corresponding UEs have a frequency domain peak. Given a large UE pool, this is not crucial since in general, some UE will always be at a peak at every subband. However, in a low loading situation, this may be more important.

Figure 3:
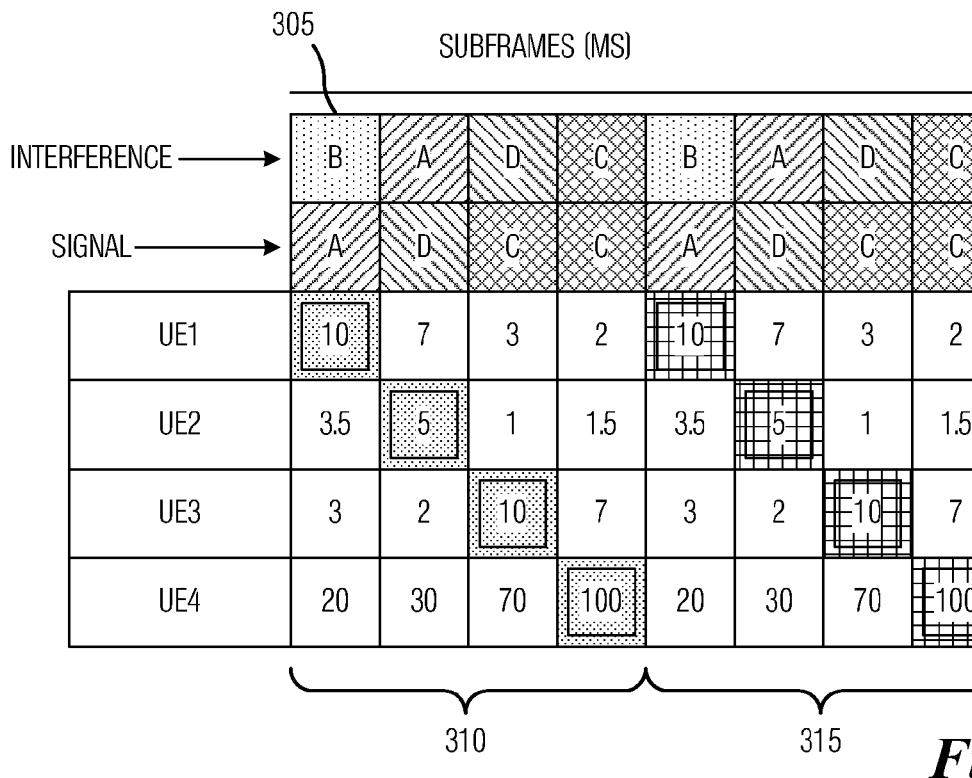
FIG. 3 is a diagram of CQI as reported by UEs.

FIG. 3 illustrates a diagram of CQI as reported by UEs. FIG. 3 also illustrates scheduling of subframes in the time domain. CQI, as reported by a number of UEs, is shown for different subframes. For example, at subframe 305, UE1 reported CQI of 10, while UE2 reported CQI of 3.5, UE3 reported CQI of 3, and UE4 reported CQI of 20. A maximum CQI for each UE is shown highlighted in shaded boxes with smaller sub-squares, with a maximum CQI for UE1, UE2, UE3, and U4, being 10, 5, 10, and 100, respectively. Spans 310 and 315 highlight two beam cycles. Notice that subframes that yielded maximum CQI for each of the UEs in span 310 also produce maximum CQI for each of the UEs in span 315. Letters in interference and signal subframe correspond to specific beams and identical letters represent identical beams.

With coordinated beam switching, it may be possible to modify the purely time frequency domain scheduling shown in FIG. 3 into a time-frequency domain based scheduling by adding frequency domain based scheduling to the time domain based scheduling.

Figure 4A:
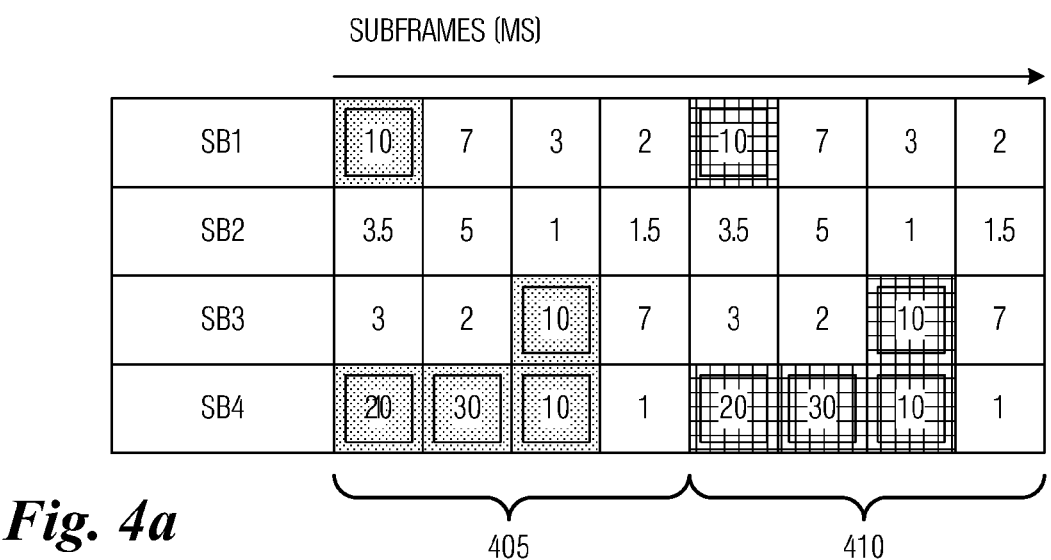
FIG. 4a is a diagram of CQI per subband as reported by UEs.
Figure 4B:
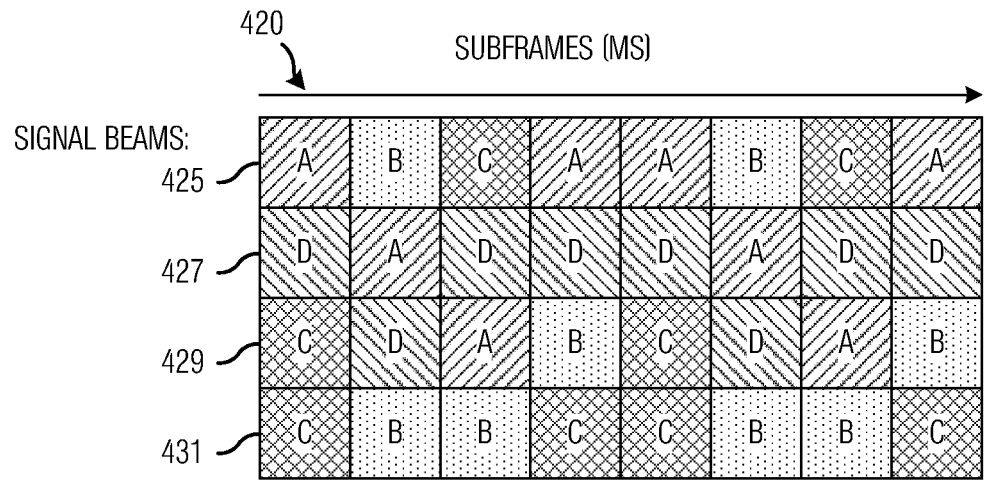
FIG. 4b is a diagram of subband allocation of signal beams.
Figure 4C:
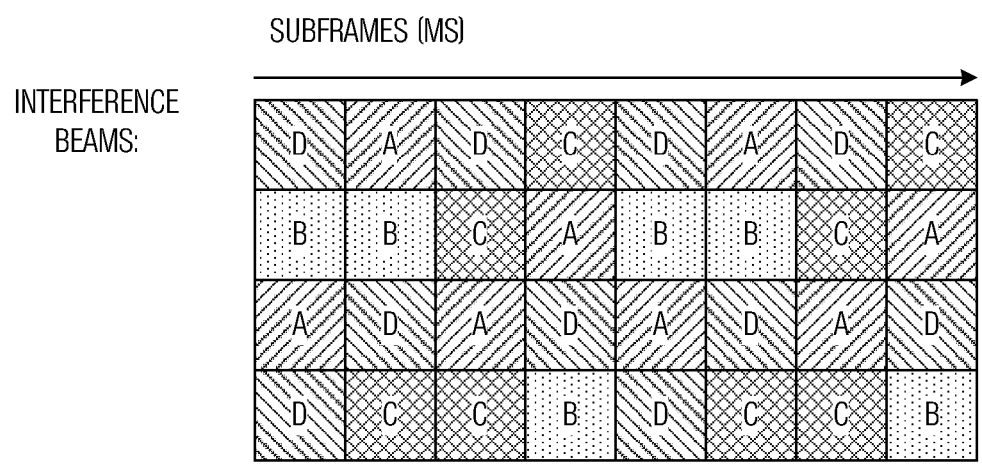
FIG. 4c is a diagram of subband allocation of interference beams.

FIG. 4a illustrates a diagram of CQI per subband as reported by UEs for two subframe cycles (shown as span 405 and span 410). Within each subframe cycle, the five highest reported CQI for all UEs are highlighted, wherein in span 405, the five highest reported CQI are highlighted with shaded squares and in span 410, the five highest reported CQI are highlighted with cross-hatched squares. FIGS. 4b and 4c illustrate diagrams of subbands available within each subframe, with FIG. 4b showing subband allocation of signal beams and FIG. 4c shown subband allocation of interference beams. Letters in subbands correspond to specific beams and identical letters represent identical beams. For example, FIG. 4b shows that there are four subbands per subframe and for subframe 420, subband 425 may be allocated to one UE, subband 427 may be allocated to another UE, while subbands 429 and 431 may be allocated to yet another UE.

The aim of a coordinated beam switching system is to make the interference pattern cyclical and therefore predictable. This means that once a NB has decided which beams to use in a beam cycle, it should not change this decision easily and has to maintain the beam cycle for at least a long time (on the order of a few seconds). A problem associated with making a bad beam selection, is that a UE may not select that bad beam in the future thus resulting in a "dead beam," that is a beam that is a part of the beam cycle, but no users reporting a CQI for that timeslot, thus resulting in a wasted timeslot.

Therefore careful consideration should be given to the beam selection process. For the case of a single band, it was shown that, in order to achieve proportionally fair rates for the UEs, the rate at which a particular beam is chosen should be made proportional to the number of UEs that lie within the beam (see P. Hosein and C. Van Rensburg, "On the Performance of Downlink Beamforming with Synchronized Beam cycles (Invited Paper)", Proc. VTC 2009 Spring, Barcelona, April 2009, which is incorporated herein by reference). For example, if there are 10 UEs and nine UEs lie within beam one (1) while one UE lies within beam two (2) then beam one should be scheduled nine times more often than beam two.

The same holds true for multiple subbands with the only difference being that the granularity in which beams are chosen is now increased since in a single frame, each subband may be assigned a different beam. Therefore as long as beams are allocated proportional to the number of UEs within the beam then cross-beam fairness may still be maintained.

Once a beam is chosen, a scheduler may be responsible for choosing the UEs to be served within the beam and hence is responsible for maintaining fairness among UEs in the same beam. Therefore, by maintaining cross-beam fairness (through beam allocations) and intra-beam fairness (through the scheduler) then fairness among all UEs may be obtained.

Cell coordination may occur at many levels. For example, a central scheduler has full knowledge of all radio conditions of all UEs in a cluster of cells and tries to find a global optimum selection of UEs to be served at any instant in time. The use of the central scheduler would unfortunately require an excessive overhead on the backhaul, and may be simply impossible to implement when fundamental delays associated with backhaul transmission is considered.

In a co-assigned U.S. Provisional Patent application Ser. No. 61/172,622, filed Apr. 24, 2009, entitled "System and Method of Allocating Beams in Time-Frequency Space Enable Coordinate Beam Switching in a Wireless Communications System," which provisional patent application is incorporated herein by reference, a simpler solution is proposed with the addition of a beamforming mode referred to as coordinated beam switching mode. In coordinated beam switching mode, every NB would determine its own cycling pattern from either a predefined pattern based on its load and user distribution, and then communicate this information over the backhaul to the other NB's in the cluster. This pattern does not need to be communicated to the UE, only its period. This Mode implies:

1. The reference sequence (RS) on Antenna port 5 (a dedicated channel) is always switched on, effectively a precoded CQI reference signal.
2. A UE measures CQI based on the precoded CQI reference signal (Antenna port 5).
3. The NBs in a cluster taking part in the coordination agree and broadcast the period of the beam cycling pattern. For example, a NB with 8 antennas may choose a period of 8, while a NB with 4 antennas my select a period of 4. The cluster period will be determined either by a cluster controller or some function of the reported cell periods such as greatest reported period namely 8.
4. A cluster controller determines based on the reported cycling periods, an optimum cycling period and reports this period back to the individual NBs. The NBs then have to adjust their preferred cycling period to the cluster controller period and broadcast this period to the UE's in the cells.
5. Alternatively, the period is determined by the standard and each NB determines its beam cycling pattern accordingly, and the period does not need to be broadcasted since the UE's will already know this value from the standard.
6. The UE reports the subframe where the maximum CQI was measured in the period, and reports one CQI per period.

According to the LTE technical standards, Antenna port 5 is configured as a UE specific RS which is only switched on during data transmission on the physical downlink shared channel (PDSCH). The above solution has a mode wherein Antenna port 5 is configured as a cell specific RS which is permanently switched on during this mode. The proposed use of Antenna port 5 as a common RS is such that if all NBs in a cluster cycled through a set of predefined beams over a specific period of a certain number of subframes where both the RS and PDSCH use the same beams. This may cause both a predictable beam and interference to a UE. Given that the UE will then measure the CQI directly from the cell specific RS on Antenna port 5, there may be no ambiguity about the CQI as is currently the case with the UE specific RS.

Considering that Antenna port 5 will be activated primarily in correlated fading environments, it is expected that some beams will lead to much better CQI reports than others. In order to reduce the CQI feedback overhead and to avoid feeding back bad CQI's, it is proposed that only good (or only the best) CQI be feedback within a certain period, which will be a fixed (or slowly varying) value within a cluster of cells.

Advantages of the above solution include:
  The UE does not need to perform a channel estimate on an interfering cell.
  The UE does not need to report a preferred PMI nor a preferred interferer PMI.
  The CQI calculated is a function of the complete interference environment, not only based on the strongest interferer.
  The UE does not need to know the configuration of the other NBs in the cluster. For example some NBs could have different numbers of antennas, and different configurations. Some NBs may not even participate in the coordination and the UE does not need to know that. If a neighboring NB has an uncorrelated antenna configuration, and does not operate in the coordinate beam switching mode (it may perform spatial multiplexing or transmit diversity), then the CQI will be a function of the data transmitted in the REs where the Antenna port 5 RS would normally be.

According to a first embodiment, direction of arrival (DOA) uplink (UL) information is used for NB coordination. The UEs have no information and a scheduler operates in a restricted mode with least multi-user diversity gain (MUDG) and least beam forming gain. There is no precoded RS. From the UE's perspective there is no coordination and it is in a current beamforming mode where the UE operates in the current CQI "mode 7" (single antenna port, port 5) mode, where the UE only sees one RS and reports CQI based on that single RS and the NB adjusts the reported CQI by the expected beamforming gain. The NB selects a beam for the UE based on the uplink measurements (based on DOA type measurements) and applies that beam on the downlink to the Physical Downlink Shared Channel (PDSCH), a traffic channel, as well as to the demodulation RS (port 5). This embodiment requires an uplink/downlink antenna calibration operation.

A UE can measure and report the SINR based on Antenna port 0 (this will also capture the beamformed interference information as well as the frequency selective signal channel information). Then the NB can scale the reported CQI by the antenna gains to get the beamformed CQI just as is currently done in the beamforming mode. Also, if the NB knows when it plans to schedule a particular beam, then what is needed is for the UE to report a CQI corresponding to a particular time-frequency slot (especially since cycling in time and frequency is occurring).

It needs to be ensured that the UE does not arbitrarily average the measured CQI, instead it either does not average altogether (and leave the averaging to the NB) or only averages the CQI over similar time frequency slots which are separated by exactly the beam period. Thus, the CQI measured may become tied to a specific time-frequency slot (also commonly referred to as a resource-specific CQI).

An advantage of this method is that the control signaling and RS overhead is very small. Also, most of the coordination can already be realized in within the current Release 8 LTE Technical Specifications.

Figure 5:
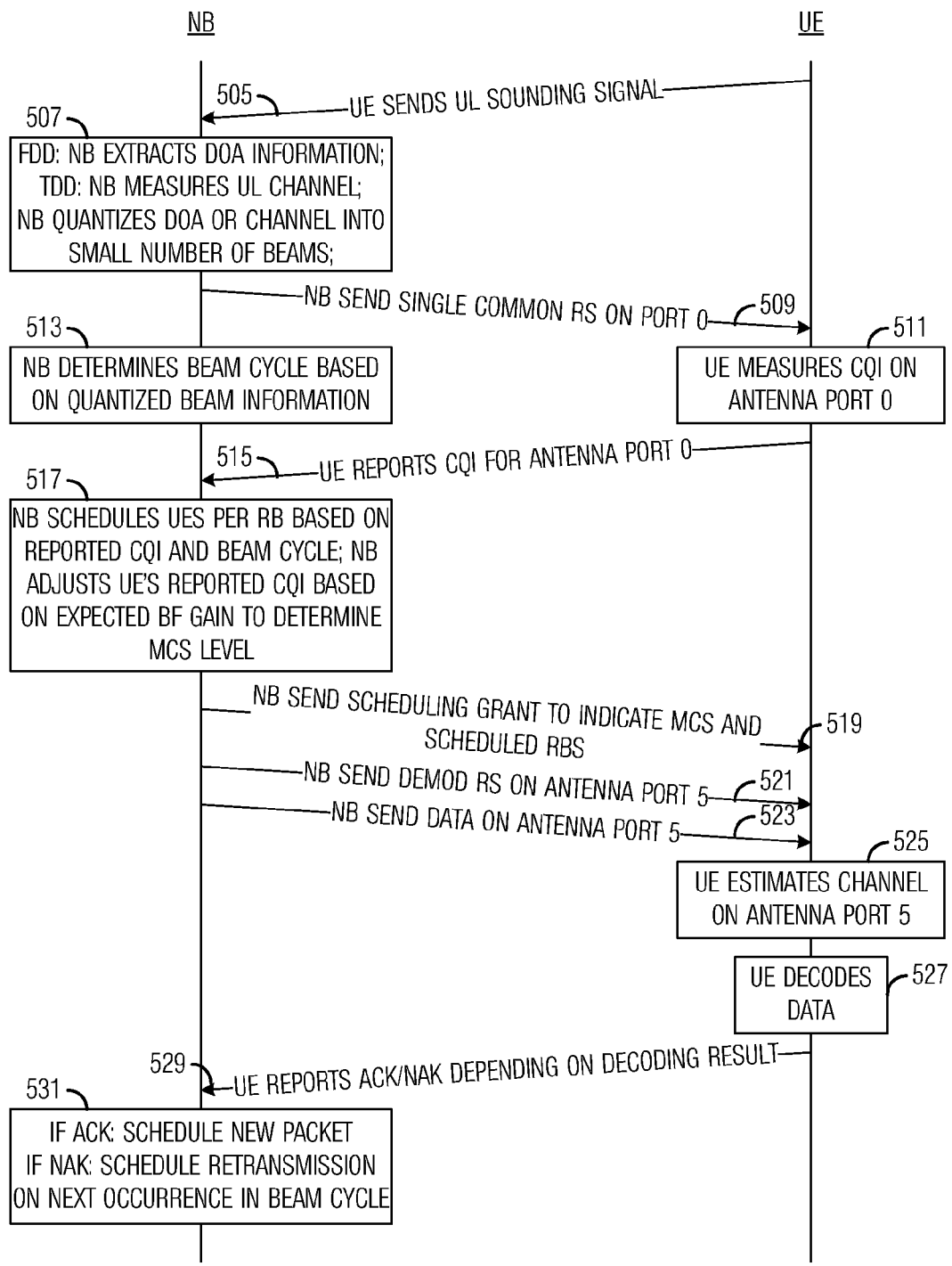
FIG. 5 is a first call flow diagram of messages exchanged between a NB and UEs in NB coordination.

FIG. 5 illustrates a first call flow diagram of messages exchanged between a NB and UEs in NB coordination of a wireless communications system as described above. NB coordination may begin with a UE sending a UL sounding signal (transmission 505). A NB may then detect the sounding signal from the UE. Depending on the transmission mode of the wireless communications system, the actions of the NB may differ. For example, if frequency division duplex (FDD) is used, then NB extracts DOA UL information, while if time division duplex (TDD) is used, then NB measures the UL channel. Furthermore, the NB quantizes either the DOA UL information or the channel information into a small number of beams (block 507). The NB may then send a single common RS on Antenna port 0 (a single antenna) (transmission 509).

The UE may measure CQI on Antenna port 0 (block 511) while the NB determines beam cycle based on the quantized beam information (block 513). The UE also reports CQI for Antenna port 0 to the NB (transmission 515). Using CQI and beam cycle, the NB schedules UEs per resource block (RB). Additionally, the NB adjusts the UE's reported CQI based on expected beamforming gain to determine MCS level (block 517).

The NB then sends a scheduling grant to indicate MCS and scheduled RBs (transmission 519). Furthermore, the NB sends a demodulation RS on Antenna port 5 as well as data on Antenna port 5 (transmissions 521 and 523). The UE estimates the channel on Antenna port 5 (block 525) and decodes the data (block 527). Depending on the results of the decoding of the data, the UE may either send an ACK or a NAK back to the NB (transmission 529). If the NB receives an ACK from the UE, then the NB may schedule a new transmission. However, if the NB receives a NAK, then the NB may schedule a retransmission on a next occurrence of the beam cycle (block 531).

Table 1 provides a tabular description of the message exchange shown in FIG. 5.

All the coordination will happen in the scheduler. The NB scheduler will consider for scheduling only those UE's in the current Resource Block (RB) who's reported PMI's match the current beam index according to the beam scheduler, as well as only those UE's that reported a CQI for the current RB.

TABLE 1

Timeline (each row is a subframe) of NB and UE actions of the first embodiment, with the associated signaling.

| NB ACTION | MESSAGE | UE ACTION |
|---|---|---|
|  | ← UE SEND UL SOUNDING SIGNAL |  |
| FOR FDD NB EXTRACTS DOA INFORMATION. FOR TDD NB MEASURES UL CHANNEL NB QUANTIZES EITHER DOA(FDD) OR CHANNEL (TDD) INTO SMALL NUMBER OF BEAMS |  |  |
|  | NB SEND SINGLE COMMON RS ON ANTENNA PORT 0 → |  |
| NB DETERMINES BEAM CYCLE BASED ON QUANTIZED BEAM INFORMATION |  | UE MEASURES CQI ON ANTENNA PORT 0 |
|  | ← UE REPORTS "MODE 7" CQI FOR ANTENNA PORT 0 |  |
| NB SCHEDULES UE'S PER RB BASED ON REPORTED CQI AND BEAM CYCLE NB ADJUSTS UE'S REPORTED CQI BASED ON EXPECTED BEAMFORMING GAIN TO DETERMINE MCS LEVEL |  |  |
|  | NB SEND SCHEDULING GRANT TO INDICATE MCS AND SCHEDULED RB'S→ NB SEND DEMOD RS ON ANTENNA PORT 5→ NB SEND DATA ON ANTENNA PORT 5→ | UE ESTIMATES CHANNEL ON ANTENNA PORT 5 UE DECODES DATA |
|  | ← UE REPORTS ACK OR NACK DEPENDING ON DECODING SUCCESS |  |
| IF ACK: SCHEDULE NEW PACKET IF NACK: SCHEDULE RETRANSMISSION ON NEXT OCCURRENCE IN BEAM CYCLE |  |  |

According to a second embodiment, coordinated beam switching may be implemented as a scheduler, with the scheduler operating in a restricted mode with least MUDG and most PMI gain. The UE does not know about the coordination and simply reports a best PMI and a matching CQI as usual, and CBS is implemented by forcing restrictions on the scheduler. Once again there is a need to ensure is that the UE does not arbitrarily average the measured CQI, but either does not average altogether (and leave the averaging to the NB) or only averages the CQI over similar time frequency slots which are separated by exactly the beamperiod. Thus, the CQI measured may become tied to a specific time-frequency slot (also commonly referred to as a resource-specific CQI).

In this embodiment it is preferred (but not limited to) that the UE operates in Rank 1 PMI mode, where it only feeds back the preferred PMI in a slow way. A slow feedback is preferable since the beamcycle is changed slowly. Also a slow PMI feedback would help prevent a situation wherein the UE ping-pongs between two different neighboring beams and thereby upsetting the beam scheduler, who may be triggered to update the beam cycling pattern. The UE will further feedback a CQI corresponding to the reported PMI for either its best subband or for multiple subbands.

An advantage of this embodiment is that the control signaling is very small for this method. Also, most of the coordination can already be realized in within the current Release 8 LTE Technical Specifications. Another advantage is that it is possible for the NB to seamlessly and invisible to the UE, implement a restricted group scheduling technique given the current UE feedback mechanism which has a performance gain in light loads.

Figure 6:
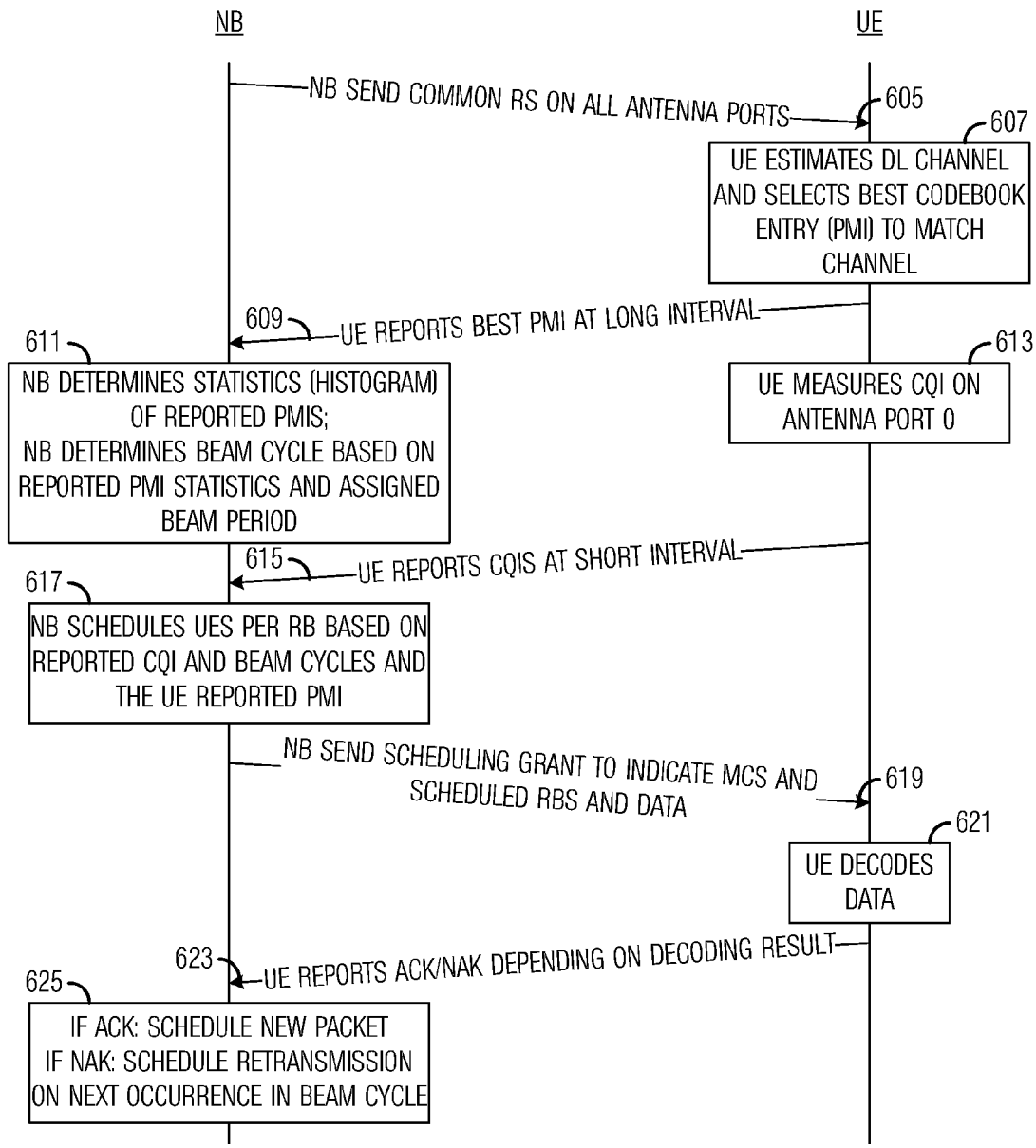
FIG. 6 is a second call flow diagram of messages exchanged between a NB and UEs in NB coordination.

FIG. 6 illustrates a second call flow diagram of messages exchanged between a NB and UEs in NB coordination of a wireless communications system. NB coordination may begin with a NB sending a common RS on all antenna ports (transmission 605). A UE may use the common RS to estimate a DL channel and selects a best codebook entry (PMI) to match the DL channel (block 607). The UE transmits the best PMI (or several top PMIs) at a long interval to the NB (transmission 609).

The NB may generate statistics, for example, histograms, from reported PMIs from the UEs. Additionally, the NB may determine a beam cycle based on the generated statistics and assigned beam period (block 611). The UE may also measure CQI on Antenna port 0 (block 613). The UE may transmit CQI to the NB at a short interval (transmission 615).

Using the reported CQI, PMI, statistics, and the beam cycles, the NB schedules UEs to RBs (block 617) and transmits scheduling grants to indicate MCS and scheduled RBs, as well as data (transmission 619). The UE decodes the data transmission (block 621). Depending on the results of the decoding of the data, the UE may either send an ACK or a NAK back to the NB (transmission 623). If the NB receives an ACK from the UE, then the NB may schedule a new transmission. However, if the NB receives a NAK, then the NB may schedule a retransmission on a next occurrence of the beam cycle (block 625).

Table 2 provides a tabular description of the message exchange shown in FIG. 6.

begin with the NB sending a common RS on all antenna ports (transmission 705). A UE may use the common RS to estimate a DL channel and selects a best codebook entry (PMI) to match the DL channel (block 707). The UE transmits the best PMI (or several top PMIs) at a long interval to the NB (transmission 709).

The NB may generate statistics, for example, histograms, from reported PMIs from the UEs. Additionally, the NB may determine a beam cycle based on the generated statistics and assigned beam period (block 711). The NB may then broadcast the beam cycle to all UEs (transmission 713). The UE calculates CQI per RB based on the broadcasted beam cycle,

TABLE 2

Timeline (each row is a subframe) of NB and UE actions of the second embodiment, with the associated signaling.

| NB ACTION | MESSAGE | UE ACTION |
|---|---|---|
| | NB SEND COMMON RS ON ALL ANTENNA PORTS → | |
| | | UE ESTIMATES DL CHANNEL, AND SELECTS THE BEST CODEBOOK ENTRY (PMI) TO MATCH CHANNEL |
| | ← UE REPORTS BEST PMI AT LONG INTERVAL | |
| NB DETERMINES STATISTICS (HISTOGRAM) OF REPORTED PMI'S. NB DETERMINES BEAM CYCLE BASED ON REPORTED PMI STATISTICS AND ASSIGNED BEAM PERIOD | | UE CALCULATES CQI PER RB BASED ON SELECTED PMI. UE CANNOT AVERAGE CQI'S!! |
| | ← UE REPORTS CQI'S AT SHORT INTERVAL | |
| NB SCHEDULES UE'S PER RB BASED ON REPORTED CQI AND BEAM CYCLE AND THE UE REPORTED PMI | | |
| | NB SEND SCHEDULING GRANT TO INDICATE MCS AND SCHEDULED RB'S AND DATA → | |
| | | UE DECODES DATA |
| | ← UE REPORTS ACK OR NACK DEPENDING ON DECODING SUCCESS | |
| IF ACK: SCHEDULE NEW PACKET IF NACK: SCHEDULE RETRANSMISSION ON NEXT OCCURRENCE IN BEAM CYCLE | | |

According to a third embodiment, the UEs know the cycling pattern. This embodiment has the most MUDG and least PMI gain. In this embodiment the UE would know the beam cycling pattern and reports CQI to RB's according to the measured SINR when the given beam is applied to the given RB. The cycling pattern can either be signaled to the UE, or the UE can simply measure the CQI based on a beamformed pilot.

The NB will operate in an unrestricted way since all CQI's from all UE's reported can be scheduled at any time since all reports would already have considered the correct beams. This will lead to the maximum multi user diversity gains possible.

An advantage of this method is that the maximum multi-user diversity gains are possible which will make a big difference at light cell loads. Another advantage is that the UE does not need to report PMI's.

Figure 7:
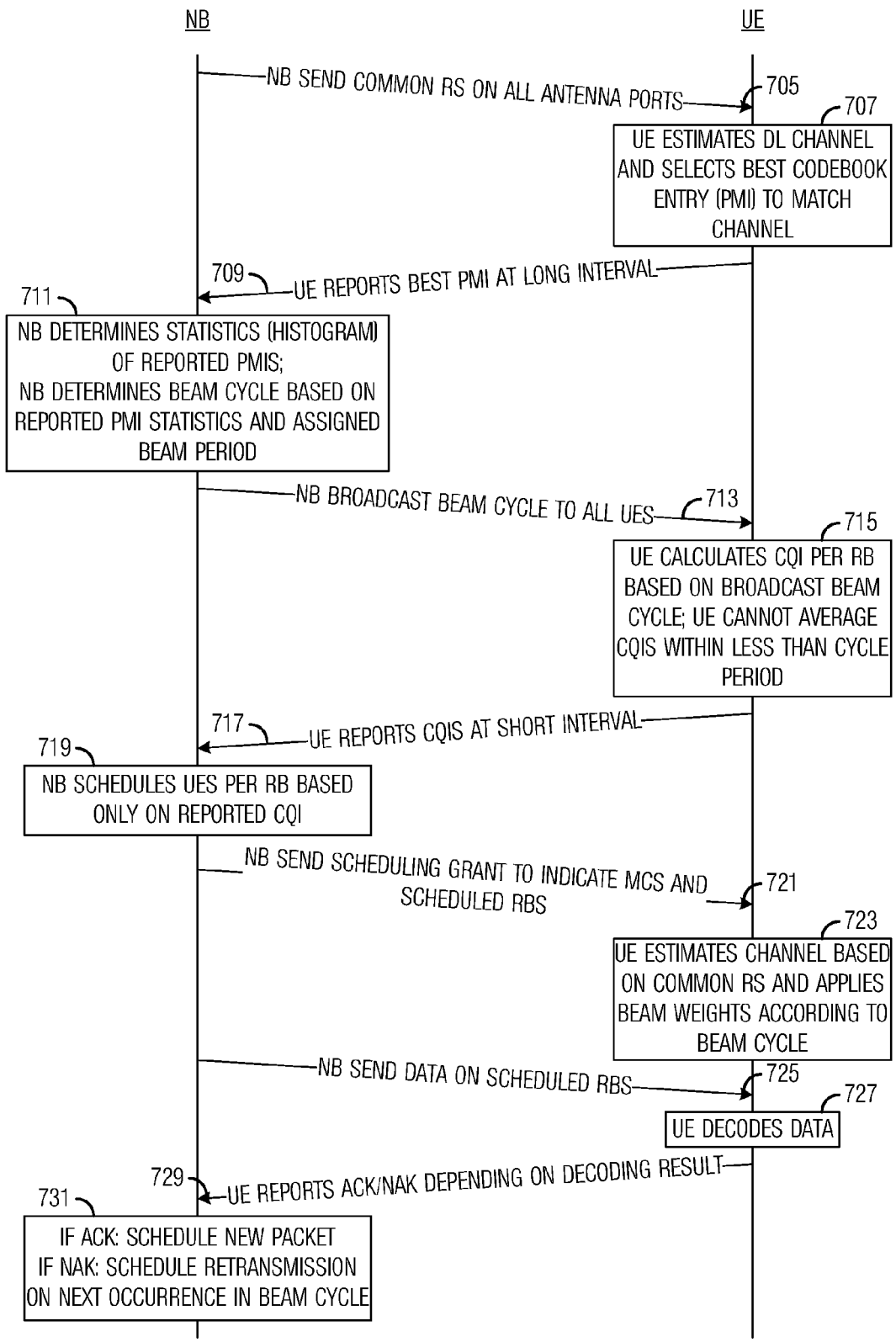
FIG. 7 is a third call flow diagram of messages exchanged between a NB and UEs in NB coordination.

FIG. 7 illustrates a third call flow diagram of messages exchanged between a NB and UEs in NB coordination of a wireless communications system. NB coordination may with a restriction wherein the UE cannot average CQIs within less than a cycle period (block 715).

The UE reports CQIs at a short interval (transmission 717). The NB schedules UEs per RB based only on reported CQI (block 719) and sends scheduling grants to indicate MCS and scheduled RBs (transmission 721). The UE estimates the DL channel based on the common RS and applies beam weights according to the beam cycle (block 723).

The NB sends data on scheduled RBs (transmission 725). The UE decodes the data transmission (block 727). Depending on the results of the decoding of the data, the UE may either send an ACK or a NAK back to the NB (transmission 729). If the NB receives an ACK from the UE, then the NB may schedule a new transmission. However, if the NB receives a NAK, then the NB may schedule a retransmission on a next occurrence of the beam cycle (block 731).

Table 3 provides a tabular description of the message exchange shown in FIG. 7.

TABLE 3

Timeline (each row is a subframe) of NB and UE actions of a third embodiment, with the associated signaling.

| NB ACTION | MESSAGE | UE ACTION |
|---|---|---|
| | NB SEND COMMON RS ON ALL ANTENNA PORTS → | |
| | | UE ESTIMATES DL CHANNEL, AND SELECTS THE BEST CODEBOOK ENTRY (PMI) TO MATCH CHANNEL |
| | ← UE REPORTS BEST PMI AT LONG INTERVAL | |
| NB DETERMINES STATISTICS (HISTOGRAM) OF REPORTED PMI'S. NB DETERMINES BEAM CYCLE BASED ON REPORTED PMI STATISTICS AND ASSIGNED BEAM PERIOD | | |
| | NB BROADCASTS BEAM CYCLE PATTERN TO ALL UE'S AT LONG INTERVAL→ | |
| | | UE CALCULATES CQI PER RB BASED ON BROADCASTED BEAM PATTERN. UE CAN ONLY AVERAGE CQI'S OVER A BEAM PERIOD |
| | ← UE REPORTS CQI'S AT SHORT INTERVAL | |
| NB SCHEDULES UE'S PER RB BASED ONLY ON REPORTED CQI | | |
| | NB SEND SCHEDULING GRANT TO INDICATE MCS AND SCHEDULED RB'S→ | |
| | NB SEND DATA→ | UE ESTIMATES PRECODED CHANNEL BASED ON COMMON RS AND KNOWN BEAM CYCLE PATTERN UE DECODES DATA |
| | ← UE REPORTS ACK OR NACK DEPENDING ON DECODING SUCCESS | |
| IF ACK: SCHEDULE NEW PACKET IF NACK: SCHEDULE RETRANSMISSION ON NEXT OCCURRENCE IN BEAM CYCLE | | |

Performance evaluation of the second and third embodiments are provided, using a per subband scheduler and 10 UE/sector. Results for the first embodiment are not provided, since ideally, it can achieve the same performance as the third embodiment. Thus each subband is scheduled independent of previous subbands. Table 4 summarizes the system simulation settings.

TABLE 4

System Simulation settings.

| | |
|---|---|
| Number (Tx, Rx) | (4, 2) |
| Antenna Separation (Wavelength) | (0.5, 0.5) |
| Channel Model | SCM (Urban Macro, 8 degree spread) |
| Scheduler | Proportional Fair |
| Users per Cell | 10 |
| Control Overhead | None |
| HARQ | None |
| Receiver Processing | MRC |
| FFT size, Bandwidth | 1024, 10 MHz |
| STS Distance | 500 m |
| Link to System | Effective SNR/Mutual Information |
| Shadow Fading | 8 dB |
| Isolation | 20 dB |
| NB Tx Power | 40 W |
| Rank Adaptation | None - only Rank 1 transmissions |
| UE Speed | 3 km/h |
| Subband Size/Scheduling Unit | 2 RB's = 24 tones |

Figure 8:
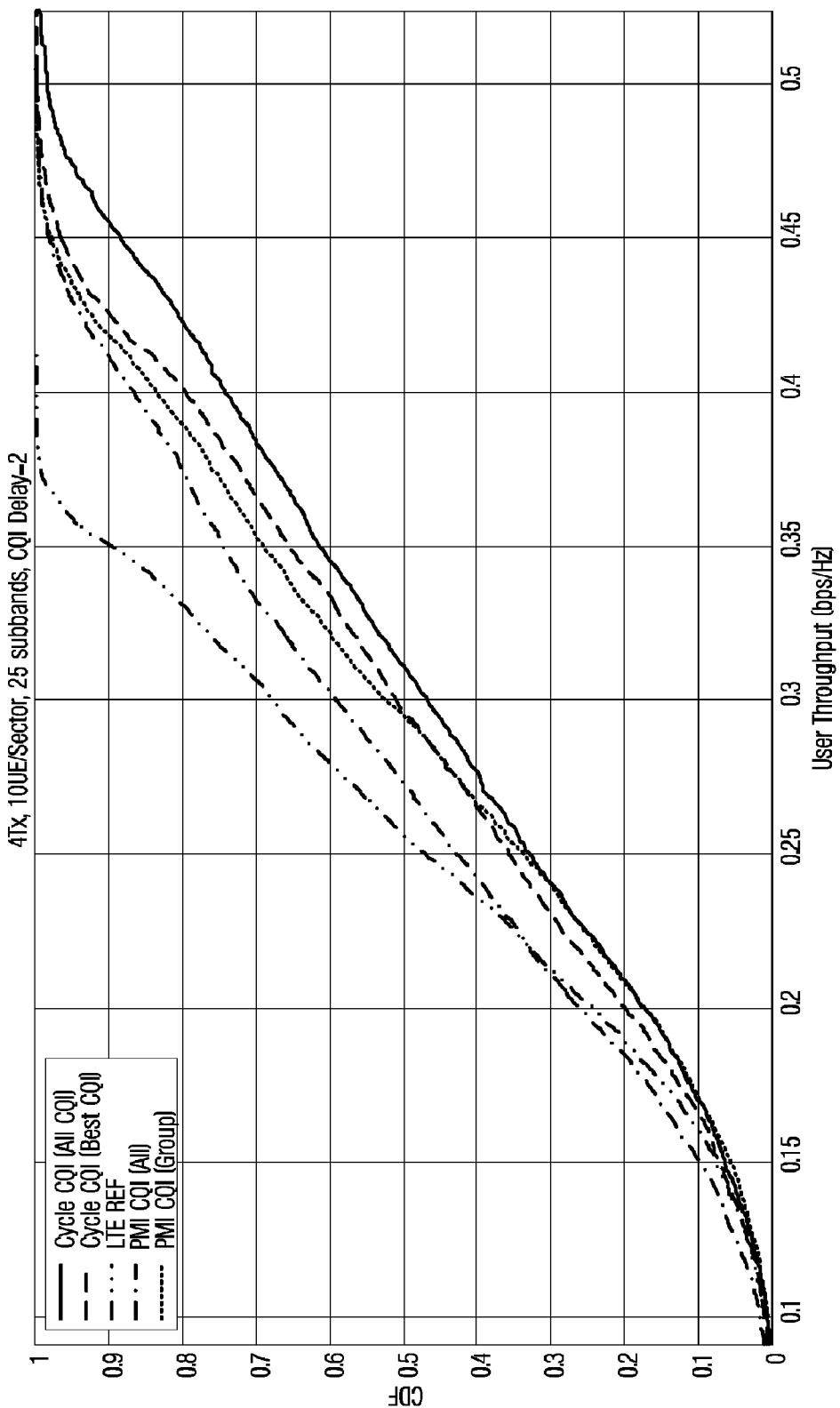
FIG. 8 is data plot of the CDF of user throughput.

Further evaluations have been performed to compare the second and the third embodiments with an uncoordinated beamforming method. The CDF of the user throughput results are presented in FIG. 8. Note that all the beams come from the same code book in all cases. The legends are:

LTE Ref: This is the uncoordinated beamforming reference. The UE feeds back all CQI's for all subbands, delayed by 2 ms.

Second Embodiment

PMI CQI (All): Strict Coordinated beamforming where the NB has to adhere to the beam cycle pattern. The UE feeds back all CQI's for all subbands, delayed by 2 ms.

PMI CQI (Group): Flexible Coordinated beamforming where the NB has some flexibility to trade of multi user diversity gain vs. flashlight effect, as described in [13]. The UE feeds back all CQI's for all subbands, delayed by 2 ms.

Third Embodiment

Cycle CQI (All CQI): Coordinated beamforming. The UE feeds back all CQI's for all subbands, delayed by 2 ms. Note the overall optimal performance.

Cycle CQI (Best CQI): Coordinated beamforming The UE feeds back only the CQI's for the best beams subbands, delayed by 2 ms.

Figure 9:
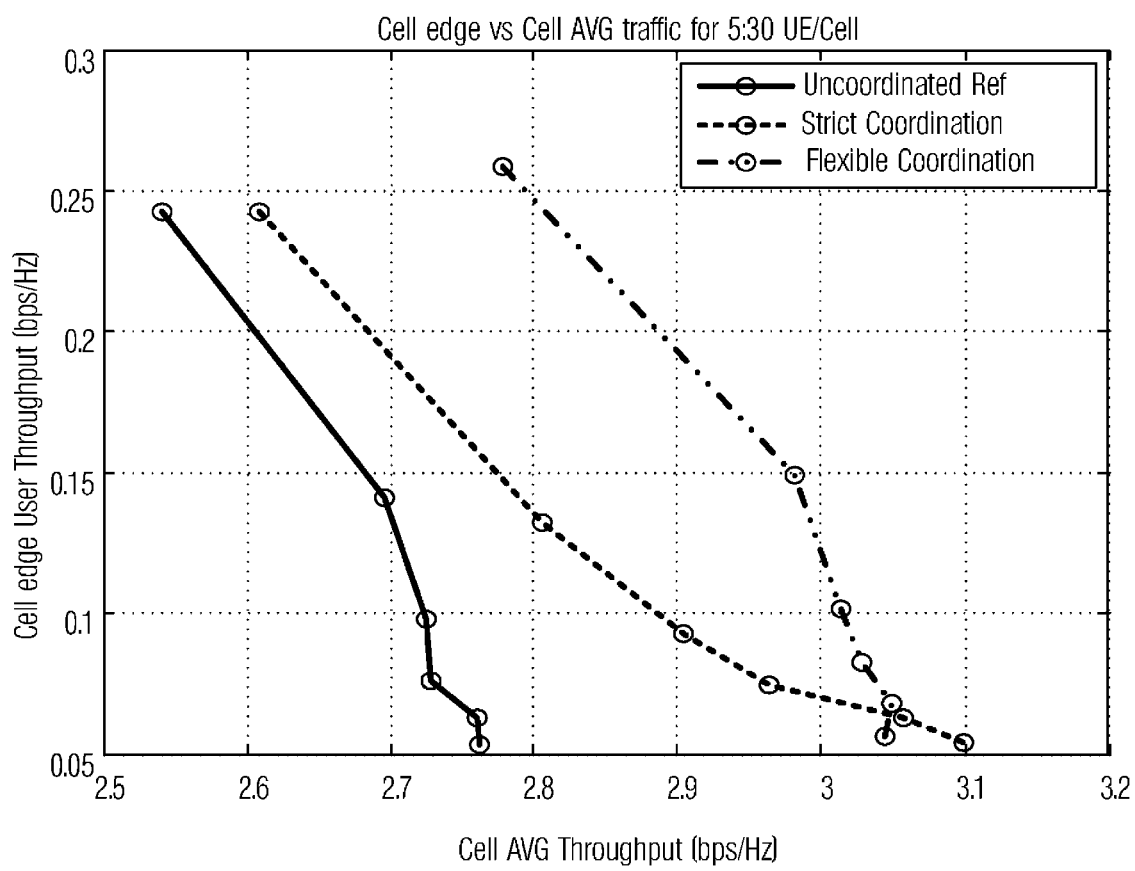
FIG. 9 is a data plot of cell edge versus cell average performance under traffic loads of [5,10,15,20,25,30] UE/Cell.

Additional performance evaluations are performed to evaluate the performance when using coordinated techniques under different traffic loads. In these evaluations, a coordinated eNB cluster as described before is again implemented. In these simulations the Reference LTE averages the reported CQI in order to limit the packet error rate. In fact if the CQI is not averaged, the performance degrades with increasing loads due to the increased flashlight effect under heavy loads. The Coordinated techniques do not need to average the CQI's since the flashlight effect is already contained. Here, one additional form of coordination was included, where the eNB has to choose between a strict coordination (Method 2) or where the coordination can be done more flexibly as described in co-assigned U.S. Provisional Patent application, Ser. No. 61/144,370. From the simulation results in FIG. 9, it is clear that both cell edge UE throughput and cell average throughputs are improved when using coordinated eNB's. As is expected, the strict coordination has the most gain at heavy loads, but the gains drop towards the light loads. Alternatively, the flexible coordination technique finds a balance between the flashlight effect and multi user diversity gains. So, here the flexible coordination provides good gains at low loads and less gain at high loads.

Previously, a method of beamswitching which is transparent to the UEs given some small restrictions, namely knowledge of a cycle period and measuring CQI from a dedicated RS. However, it may be possible to depart from the completely blind method to introduce a more active coordination and UE knowledge of possible beams. The possible beams may be limited to codebook entries in a LTE codebook, although any other suitable codebook may be used.

Beam switching is good for very heavily loaded cells because there are always UE's that can optimally benefit from the limited number of beams somewhere in the band. It also removes the flashlight effect completely and therefore makes the CQI the most reliable. However, Beam switching is not good for lightly loaded cells, because it is very restrictive. With lightly loaded cells, it may be hard to out perform PMI reporting especially with a large codebook.

In a PMI reporting method every UE gets the chance of being scheduled on his best PMI at every scheduling instant. With beam switching on the other hand, with many beams and few users present a dead beam problem, wherein a beam may be scheduled but there are no users that reported a CQI for that beam due to the interference situation. The scheduling of a dead beam means that the beam slot goes wasted. If only heavily loaded beams are used, capacity may be lost because UE's are now scheduled on suboptimal beams. If the number of beams is reduced, a fixed loss may result for the same reason. If only one UE selects a beam, then that UE becomes scheduled in a Round Robin way, which means that multiuser diversity gain is lost for that slot.

Flexible coordination is based on PMI feedback, and hence, on a codebook. As an example, precoders in the codebook may be grouped into a number of groups, such as three. A first group may be precoders corresponding to beams pointing to a center portion of a cell, a second group may be precoders corresponding to beams pointing to a left portion of the cell, and a third group may be precoders corresponding to beams pointing to a right portion of the cell. Coordination may arise from a fact that the groups are synchronized between the NBs but not the PMIs within the group. The coordination may introduce a controlled flashlight effect with an advantage of increased flexibility where a UE may belong to a group rather than a specific beam. Flexible coordination is based on CBS but it features advantages from both CBS and PMI feedback arising from a need to provide more coordination than simple greedy independent optimizations between NBs.

Figure 10:
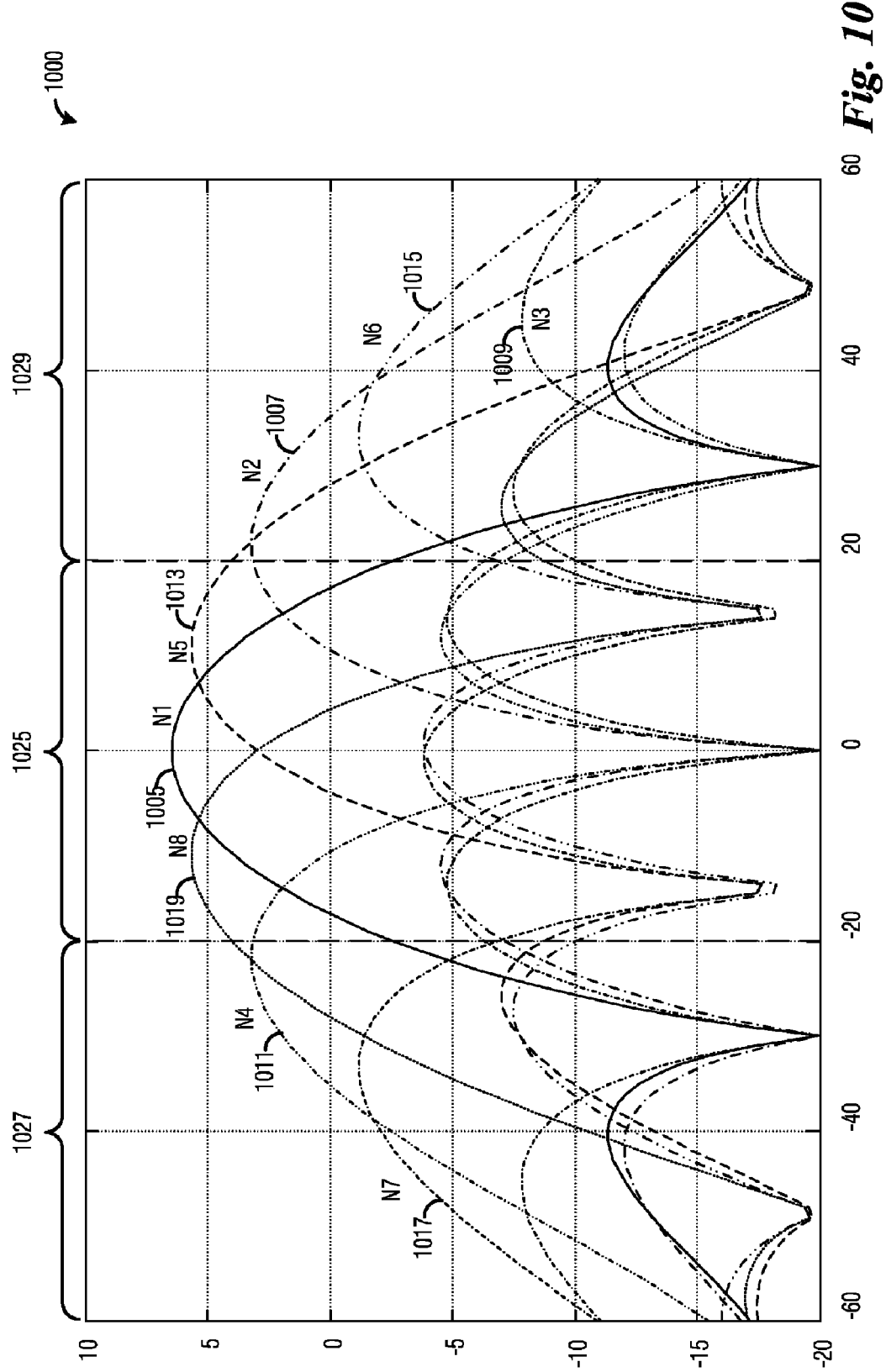
FIG. 10 is a plot of beam patterns for a number of beams.

FIG. 10 illustrates a plot 1000 of beam patterns for a number of beams. Plot 1000 illustrates beam patterns of beams of a codebook used in LTE. The codebook includes eight beams, including beam "N1" 1005, beam "N2" 1007, beam "N3" 1009, beam "N4" 1011, beam "N5" 1013, beam "N6" 1015, beam "N7" 1017, and beam "N8" 1019. The eight beams shown in FIG. 10 may be divided into three beam groups, with each beam group covering a 40 degree portion of a 120 degree sector. A first beam group 1025 referred to as center group spans from −20 degrees to +20 degrees and includes beams "N1" 1005, "N5" 1013, and "N8" 1019. A second beam group 1027 referred to as left group spans from −60 degrees to −20 degrees and includes beams "N4" 1011 and "N7" 1017, while a third beam group 1029 referred to as right group spans from +20 degrees to +60 degrees and includes beams "N2" 1007 and "N6" 1015. Beam "N3" 1009 may be an omnidirectional beam and may not be useful in restricted/grouped PMI scheduling. Therefore, beam "N3" 1009 may be omitted from any of the three beam groups.

Contrasted with beam switching, restricted/grouped PMI scheduling may use a larger number of beams, with each beam potentially covering a smaller portion of a sector. Furthermore, the beams may be partitioned into beam groups based on sector coverage area. The beams within a single beam group may be used interchangeably with one another without incurring a significant performance loss or a significant interference increase.

Although the discussion of FIG. 10 illustrates a communications system with a codebook with eight beams partitioned into three beam groups, the embodiments may be operable with a codebook with any number of beams that may be partitioned into any number of beam groups (as long as there is at least one beam per group). Typically, a number of partitions are selected so that each beam group may have two or more beams. If each beam group has a single beam, then restricted/grouped PMI scheduling may become beam switching. Therefore, the discussion of a codebook with eight beams partitioned into three beam groups should not be construed as being limiting to either the scope or the spirit of the embodiments.

Figure 11A:
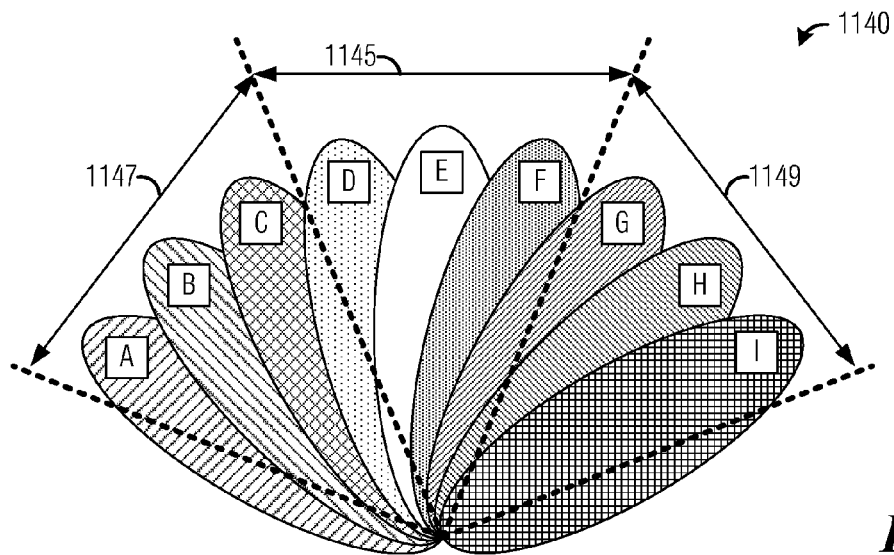
FIG. 11a is a plot of main lobes of a number of beams.

FIG. 11*a* illustrates a plot 1140 of main lobes of a number of beams. As shown in FIG. 11*a*, nine beams may be partitioned into three beam groups (center group 1145, left group 1147, and right group 1149) of three beams each. Although shown to span about equal portions of a sector, the beam groups may be partitioned so that each beam group may span a different portion of a sector. For example, in an alternate beam grouping, a center beam group may span a larger portion of a sector than a left beam group or a right beam group.

Figure 11B:
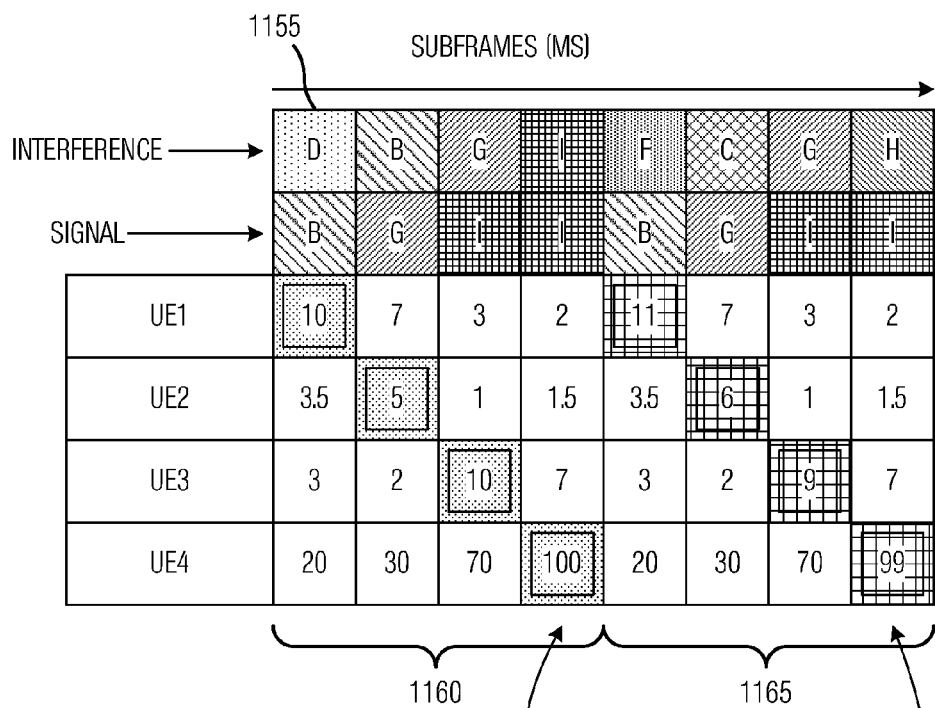
FIG. 11b is a diagram of channel quality indicator (CQI) as reported by UEs.

FIG. 11*b* illustrates channel quality indicators (CQI) as reported by UEs. FIG. 11*b* also illustrates a scheduling of subframes in the time domain. CQI, as reported by a number of UEs, is shown for different subframes. For example, at subframe 1155, UE1 reported a CQI of 10, while UE2 reported a CQI of 3.5, UE3 reported a CQI of 3, and UE4 reported a CQI of 20. A maximum CQI for each UE is shown highlighted in shaded boxes with smaller sub-squares, with a maximum CQI for UE1, UE2, UE3, and UE4, being 10, 5, 10, and 100, respectively. Spans 1160 and 1165 highlight two beam group cycles, respectively.

Subframes that yielded maximum CQIs for each of the UEs in span 1160 may not yield an identical CQI for each of the UEs in span 1165. For example, in span 1160, UE1 reported a maximum CQI of 10, but in span 1165, UE reported a maximum CQI of 11. A difference in the maximum CQI may be due to a NB transmitting a different beam within a beam group. Although the maximum CQI values may differ between spans, subframes that correspond to the maximum CQI remains consistent between spans.

Comparing FIG. 11b to FIG. 3, nine beams are used instead of four beams as shown in FIG. 3. Furthermore, the nine beams are grouped into three groups with a serving NB cycling through groups: Left, Right, Right, Right, while an interfering NB is cycling through groups: Center, Left, Right, Right. Note that during a scheduled period, the CQI may have changed slightly since an interference beam may have changed, although the interference beam remains within the same group. However, a larger number of beams are now available, which may increase a SNR for each UE without increasing a delay. Also, since PMI is calculated from a common RS, channel estimation may be better and the UE has greater freedom to pick an optimum PMI from a larger codebook.

Previously, two techniques of coordination were discussed, namely a fixed coordination technique and a flexible coordination technique. However, since both techniques may be implemented in a scheduler of a NB, it may be possible to switch between the two techniques dynamically.

In a strict coordination technique some flashlight effect exists, which means less aggressive link adaptation possible. The strict coordination technique may have better performance than fixed coordination under moderate to light loads due to higher MUDG.

With no coordination, the most flashlight effect exists. With no coordination, the least aggressive link adaptation is possible. Typically under light loads in neighboring cells the flashlight effect may be quite predictable and, therefore, not a serious problem. The no coordination technique exhibits the best performance under very low loads, because of highest MUDG.

Therefore, it may be possible to change the grouping scheme in the flexible coordination technique to adapt between the three cases mentioned. Consider again the eight beams shown in FIG. 10. Note that here a concept of group[ ] acts as a restriction on the scheduler. Therefore, the scheduler can only consider UE's where the group[$PMI_{UE}$] satisfies some criteria, such as group[PMI[UE]]=$PMI_B$, where $PMI_B$ is the PMI selected by the beam scheduler for that RB. Here a number of different groups may be selected according to the strictness of the coordination.

Strict Coordination:
  Eight distinct groups, thus group=[1,2,3,4,5,6,7,8], so that
    Group[$PMI_{UE}$]=PMI, which means the scheduler has to select a UE who has selected a similar PMI as is specified by a criteria.
No Coordination:
  One group only, thus group=[1,1,1,1,1,1,1,1], so that
    Group[$PMI_{UE}$]=1, thus the scheduler has no restriction, since the criteria is always satisfied.
Flexible Coordination:
  Three Groups corresponding to Left, Center and Right groups, thus
    group=[1,2,3,3,1,2,3,1] according to the groups in FIG. 10. Here Group[$PMI_{UE}$] can take on three values, and any group will cover two to three adjacent beams.
  Other groups can be formed such as only two groups, covering all beams on the left including the center beam, and the other group contains all the beams to the right.
  Dynamic groups can be formed. Consider having the vector of beam indices for a codebook are ordered as B=[b1 ... bN] where b1 is a left most beam and bN is a right most beam. Then group=floor(B/k) may be formed, where k is a utility function based on traffic load and average interference fluctuation.

In another embodiment, it may be possible not to apply any restriction on the scheduler, but to rather apply a penalty for a UE based on its preferred PMI vs. the NB's preferred PMI for that time frequency slot. Note that the UE's reported CQI is based on its preferred PMI and therefore the NB may need to scale down that CQI with a penalty that equals the reduction in Power that the UE will see when another PMI is used for it. As an example, one possible value for the penalty may be the magnitude of the inner product between the UE's PMI and the NB's preferred PMI. These values in dB are shown below in Table 5 for the eight PMIs shown in FIG. 10. A net effect of applying the penalty vs. grouping is the same since the penalties with similar weights correspond to the groups. For example, consider the three groups defined previously:

1. Group 1 (center): PMI1, PMI5, PMI8: Note that these correspond to the minimum penalty of −3 dB in Table 5 below.
  2. Group 2 (right): PMI 2, PMI 6: Note that these correspond to the minimum penalty of −3 dB in Table 5.
  3. Group 3 (left): PMI 4, PMI 7: Note that these correspond to the minimum penalty of −3 dB in Table 5.

TABLE 5

Penalty in dB for NB overriding UE PMI.

| UE/NB PMI | 1 | 2 | 3 | 4 | 5 | 6 | 7 | 8 |
|---|---|---|---|---|---|---|---|---|
| 1 | 0 | −20 | −20 | −20 | −3 | −11 | −11 | −3 |
| 2 | −20 | 0 | −20 | −20 | −3 | −3 | −11 | −11 |
| 3 | −20 | −20 | 0 | −20 | −11 | −3 | −3 | −11 |
| 4 | −20 | −20 | −20 | 0 | −11 | −11 | −3 | −3 |
| 5 | −3 | −3 | −11 | −11 | 0 | −20 | −20 | −20 |
| 6 | −11 | −3 | −3 | −11 | −20 | 0 | −20 | −20 |
| 7 | −11 | −11 | −3 | −3 | −20 | −20 | 0 | −20 |
| 8 | −3 | −11 | −11 | −3 | −20 | −20 | −20 | 0 |

Several techniques for flexible coordination have been described. Flexible coordination may be a way to violate coordination conditions, which may be optimal for a fully loaded communications system. These techniques include A. The NB violates the coordination and schedules a UE with a PMI different from the beam cycle PMI and so introduces some flashlight effect.

B. The NB honors the coordination by scheduling a UE with a PMI different from the beam cycle PMI, but forces the UE to use the beam cycle PMI. No flashlight effect is introduced but the reported CQI of the UE is violated since the reported CQI was based on a different PMI. The NB has two options:
  1. Determine a MCS value by the reported CQI plus a penalty; or
  2. Determine a MCS value by the reported CQI and hope that HARQ will be sufficient;

C. The NB updates the beam cycle pattern and informs the UE about the updated beam cycle pattern. No flashlight effect is introduced nor is the reported CQI violated. Since no violations have taken place, the NB may be more aggressive in MCS selection based on the reported CQI. This technique may yield the best performance.

According to another embodiment, the NB may adaptively decide on how flexible the coordination needs to be. In one extreme, the NB may be completely flexible without any coordination and in another extreme, the NB may be strictly coordinated. The decision on flexibility may be made based on traffic load, average SINR fluctuation reported by the UEs, and so forth.

The decision may be made based on traffic load since under heavy loads the NB may prefer to be very strict with coordination, while under light or bursty traffic loads, the NB may prefer the flexibility that comes with no coordination. Furthermore, when the reported SINR fluctuates rapidly, it may mean that the UE is either a high mobility UE or that the flashlight effect is severe. In the situation when the flashlight effect is sever, the communications system may benefit from more coordination. However, with a high mobility UE coordination may be difficult since an optimal beam may change rapidly as the UE moves. A utility function may need to take these effects into consideration.

According to an embodiment, a scheduler attempts to optimize (e.g., maximize) a scheduler metric, SCHD_MET. The scheduler metric may be the CQI (e.g., for a maximum capacity transmission scheduler) or the CQI scaled by an average throughput (e.g., for a proportional fair scheduler). As an example utility function, the scheduler of the NB may calculate SCHD_MET used by the scheduler as a difference (when all values are in dB and positive) between an original SCHD_MET and a UE penalty (UE_penalty). The example utility function may be expressible as SCHD_MET_coordination=SCHD_MET-abs
(UE_penalty)

where abs( ) is the absolute value function. A UE_penalty of zero implies no penalty and a UE penalty of ∞, implies the maximum penalty, for example, the scheduled PMI is orthogonal to the UE's desired PMI.

If UE_penalty=0, then the scheduler has a high chance to select the UE. As the UE penalty increases in magnitude (approaches ∞, for example), the probability that the UE is scheduled by the scheduler drops.

System load: Assume that the system load is normalized from 0 to 1 with a system_load of 0 representing no load and a system_load of 1 representing a full buffer, i.e., a load of 100%. The UE penalty may be expressed as UE_penalty=beam_correlation_factor*load_factor*max_penalty,
where beam_correlation_factor=1-correlation_
between_NB_scheduled_&_UE_reported_
beams.

An alternative definition of beam_correlation_factor may be
beam_correlation_factor=a chordal distance.

As the beam_correlation_factor increases, the penalty factor decreases, so that perfectly correlated beams have no penalty. When perfectly correlated beams are used, UE_penalty=beam_correlation_factor=0.

As the system load increases, the penalty factor increases so that in combination with the correlation, coordination kicks in. A maximum penalty may be expressed as max_penalty=maximum penalty_allowed which can
be chosen empirically.

When used with beam groups, the utility function may be made discrete, wherein a UE may be scheduled or not schedule to a beam if the UE has selected as its preferred PMI (beam) a beam that is in a beam group being scheduled. The utility function may then be referred to as a discretized utility function.

Figure 12:
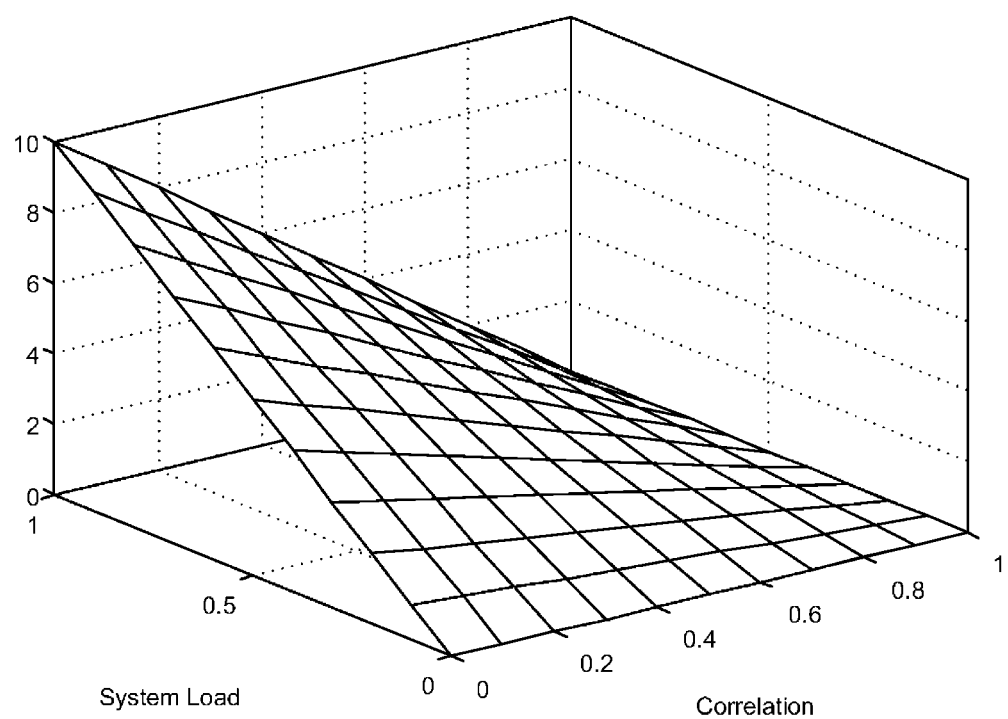
FIG. 12 is a plot of UE penalty as a function of correlation_factor and system_load.

FIG. 12 illustrates a plot of UE penalty as a function of correlation_factor and system_load. A similar analysis may be done for the flashlight effect.

The flashlight effect can be measured by using a variance of the CQI or the SINR fedback from the UE. To distinguish between the variation caused by speed and the variation caused by the flashlight effect, the NB may estimate the UE speed from any of its uplink signals, e.g., the SRS. Therefore, if a low Doppler measurement is made on the uplink but the reported CQI's have a high variation, then the NB knows that there is a high flashlight effect present. An example of a utility function can be created by using a modified coefficient of variance (var_coefficient) calculation. The modified coefficient of variance can be calculated as follows:

AVG_CQI($t$)=$\rho$*AVG_CQI($t$-1)+(1-$\rho$)*CQI($t$)

VAR_CQI($t$)=$\rho$*VAR_CQI($t$-1)+(1-$\rho$)*abs{CQI($t$)-
AVG_CQI($t$)} var_coefficient=VAR_CQI($t$)/AVG_CQI($t$)

where $\rho$ is a filter constant, typically $\rho$=0.9.

As the var_coefficient increases, there is an indication that the flashlight effect is increasing and coordination should be activated by increasing the penalty. In this situation, the penalty function may be expressible as UE_penalty=beam_correlation_factor*max_penalty*var_coefficient.

Finally, all elements may be combined into a single utility function:

UE_penalty=beam_correlation_factor*load_factor*max_
penalty*var_coefficient.

Figures 13, 14:
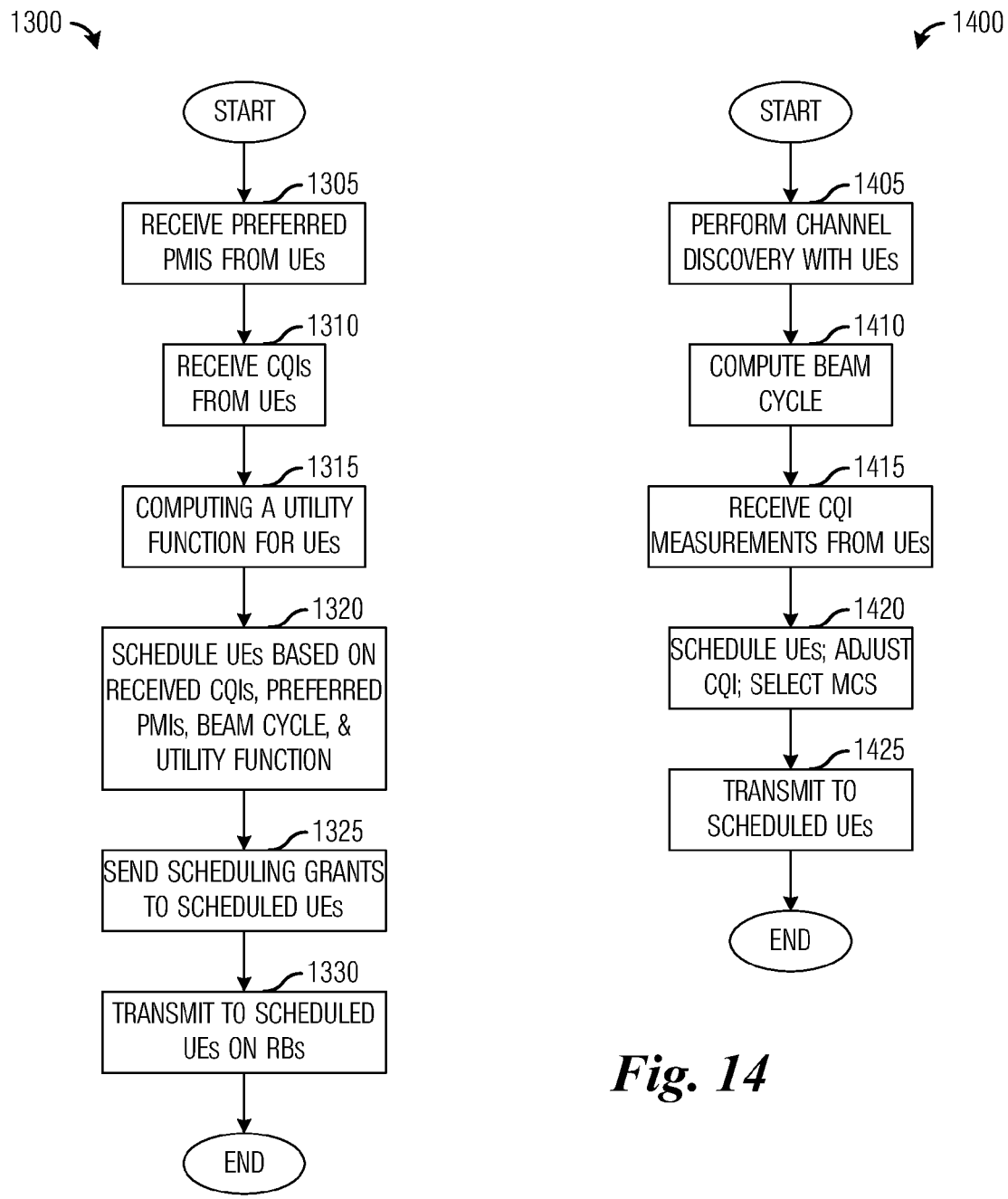
FIG. 13 is a flow diagram of NB operations in transmitting to UEs, wherein the transmissions are scheduled using a utility function.
FIG. 14 is a flow diagram of NB operations in transmitting to UEs, wherein the transmissions are scheduled using a coordinated beam switching mode, with a degree of flexibility that is dependent on operator selection and/or communications system conditions.

FIG. 13 illustrates a flow diagram of NB operations 1300 in transmitting to UEs, wherein the transmissions are scheduled using a utility function. NB operations 1300 may be indicative of operations occurring in a NB, specifically a scheduler of the NB, as the NB schedules transmission opportunities for UEs. NB operations 1300 may occur while the NB is in a normal operating mode, is serving UEs, and has data to transmit to one or more UEs.

NB operations 1300 may begin with the NB receiving preferred PMIs from the UEs that it is serving (block 1305). According to an embodiment, the UEs may report their preferred PMIs to the NB on a long schedule. The UEs may each report a preferred PMI or several top preferred PMIs.

The NB may also receive CQI measurements from the UEs (block 1310). According to a preferred embodiment, the measured CQIs from the UEs may be reported on a short schedule. As discussed previously, the UEs may be instructed to not average their CQI measurements or only to average their CQI measurements at specific intervals to ensure that the averaging is for CQI measurements from a single beam or beam group.

The NB may compute a utility function for each of the UEs providing CQI measurements (block 1315). The utility function may be used by the NB to select UEs to schedule transmission opportunities. According to an embodiment, the utility function may be evaluated based on feedback information provided by the UEs as well as information known and/or gathered by the NB. Furthermore, some of the information used in evaluating the utility function may be provided by an operator of a communications system. The utility function used in the scheduling of the UEs may be as discussed previously.

The NB may then schedule transmission opportunities for the UEs (block 1320). According to an embodiment, the NB may schedule the transmission opportunities based on received CQIs, preferred PMIs, and beam cycle. Furthermore, the NB may utilize a utility function that takes into consideration factors such as traffic load, SINR fluctuation, UE mobility, and so forth, to schedule transmission opportunities. As an example, the NB may schedule a transmission opportunity for a UE if the utility function for the UE evaluates to a value that exceeds a threshold, wherein the threshold for the UE may be dependent on factors such as system load, traffic conditions, UE service history, UE priority, transmission priority, transmission age, and so forth. A detailed discussion of the utility function and a formulation of an exemplary utility function was discussed previously.

After scheduling transmission opportunities for the UEs, the NB may send scheduling grants to the scheduled UEs (block 1325) and then at scheduled RBs, the NB may transmit to the UEs (block 1330). NB operations 1300 may then terminate.

FIG. 14 illustrates a flow diagram of NB operations 1400 in transmitting to UEs, wherein the transmissions are scheduled using a coordinated beam switching mode, with a degree of flexibility that is dependent on operator selection and/or communications system conditions. NB operations 1400 may be indicative of operations occurring in a NB, specifically a scheduler of the NB, as the NB schedules transmission opportunities for UEs. NB operations 1400 may occur while the NB is in a normal operating mode, is serving UEs, and has data to transmit to one or more UEs.

NB operations 1400 may begin with the NB performing channel discovery with the UEs that it is serving (block 1405). Channel discovery may be used to allow the UEs to make measurements of communications channels between the UEs and the NB. Channel discovery may differ depending on a type of coordinated beam switching being utilized. For example, in one form of channel discovery, the UEs may transmit sounding signals that may be received by the NB, which may then determine channel information, such as DOA, and so forth. In another example, the NB may transmit a precoded common reference sequence or an unprecoded common reference sequence, which may be used by the UEs to determine preferred precoding matrix indicators (PMIs) that the UEs may report back to the NB.

According to an embodiment, instead of providing a PMI to the NB, the UEs may provide a representation of a channel between the UE and the NB. The NB may then use the representation of the channel to select a codeword, i.e., a precoding matrix.

After channel discovery, the NB may compute a beam cycle (block 1410). The beam cycle may be computed from results of channel discovery. For example, the DOA computed by the NBs or the preferred PMIs received from the UEs may be used to compute the beam cycle. The beam cycle may have a period that may be specified by an operator of the communications system or by a technical standard.

The NB may then receive resource-specific CQI measurements from the UEs (block 1415). The resource-specific CQI measurements may be a result of an unprecoded common reference sequence transmitted by the NB. According to an embodiment, the resource-specific CQI measurements received from the UEs may be unaveraged values or they may be averaged over specific resources. If unaveraged, the NB may perform the averaging of the resource-specific CQI measurements.

Based on the resource-specific CQI measurements and/or beam cycle, the NB may then schedule the UEs (block 1420). If the coordinated beam switching technique (rigid, flexible, variation of flexible, and so on) is specified by the operator of the communications system, then the NB may utilize an appropriate coordinated beam switching technique to schedule the UEs to transmission opportunities.

If the coordinated beam switching technique is not specified, then the NB, may at start up or at specified times, select a coordinated beam switching technique to use. According to an embodiment, the coordinated beam switching technique selected by the NB may be based on communications system conditions (historical, current, or expected conditions may be used, for example). As an example, if the expected communications system conditions are expected to be very heavily traffic load, then rigid coordinated beam switching may be selected. Similarly, if the expected communications system conditions are expected to be light or medium traffic load, then a variant of flexible coordinated beam switching technique may be selected. A detailed discussion of variants of flexible coordinated beam switching techniques has been described previously.

In addition to scheduling UEs, the NB may also adjust the resource-specific CQI measurements as well as select modulation and coding scheme (MCS) to be used in the transmissions. The selection of MCS may be based on communications system conditions.

The NB may then transmit to the scheduled UEs over the scheduled transmission opportunities (block 1425) and NB operations 1400 may then terminate.

Advantageous features of embodiments of the invention may include: a method for controller coordination in a wireless communications system, the method comprising: computing a beam cycle based on a transmission from a plurality of mobile devices, wherein the mobile devices are being served by the controller; receiving a channel quality indicator from the mobile devices; scheduling the mobile devices based on the channel quality indicator and the beam cycle, thereby producing a transmission schedule; and transmitting information to the mobile devices based on the transmission schedule. The method could further include, wherein the computing a beam cycle comprises: receiving a sounding signal from each of the mobile devices; quantizing information based on the sounding signals into a number of beams; and determining the beam cycle based on the quantized information. The method could further include: further comprising extracting direction of arrival information from the sounding signal. The method could further include, further comprising measuring an uplink channel between each of the mobile devices and the controller using the sounding signal. The method could further include, wherein the computing a beam cycle comprises, transmitting a common reference sequence to each of the mobile devices; receiving a precoding matrix indicator from each of the mobile devices; computing statistical information from the precoding matrix indicators; and determining the beam cycle from the statistical information. The method could further include, wherein the precoding matrix indicator from each of the mobile devices comprises a specified number of best precoding matrix indicators from the mobile device. The method could further include, wherein the computing statistical information comprises computing a histogram of the precoding matrix indicators. The method could further include, wherein the scheduling the mobile devices comprises scheduling the mobile devices per resource block. The method could further include, further comprising receiving a response from a responding mobile device. The method could further include, further comprising, scheduling a new transmission to the responding mobile device in response to determining that the response indicates that the responding mobile device successfully decoded an information transmission; and scheduling a retransmission to the responding mobile device in response to determining that the response indicates that the responding mobile device did not successfully decode the information transmission. The method could further include, wherein the retransmission is scheduled to occur in a subsequent occurrence of the beam cycle.

Advantageous features of embodiments of the invention may include: a method for controller coordination by a mobile device in a wireless communications system, the method comprising: receiving a reference signal from a controller, wherein the controller is serving the mobile device; computing a quality indicator of a downlink channel between the controller and the mobile device; transmitting the quality indicator to the controller; receiving a scheduling grant from the controller; and receiving an information transmission from the controller based on the scheduling grant. The method could further include, further comprising, decoding the information transmission; and transmitting a response to the controller based on the decoding. The method could further include, further comprising prior to the receiving a reference signal, transmitting a sounding signal to the controller. The method could further include, further comprising, estimating the downlink channel; selecting a codeword from a codebook that most closely matches the estimate of the downlink channel; and transmitting the codeword to the controller. The method could further include, further comprising receiving a beam cycle from the controller. The method could further include, wherein the computing the quality indicator comprises computing a quality indicator per resource block based on the beam cycle. The method could further include, further comprising: estimating the downlink channel based on the reference signal; and applying beam weights according to the beam cycle.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitting information by a controller, the method comprising:
   computing a beam cycle based on transmissions from a plurality of mobile devices, wherein the mobile devices are served by the controller;
   receiving resource-specific channel quality indicators from the plurality of mobile devices;
   scheduling a transmission opportunity for a mobile device in the plurality of mobile devices, wherein the scheduling is based on the beam cycle and the channel quality indicators; and
   transmitting information to the mobile device based on the scheduled transmission opportunity.

2. The method of claim 1, further comprising:
   receiving a transmission from each mobile device in the plurality of mobile devices; and
   computing channel information from each mobile device based on the received transmission.

3. The method of claim 2, wherein computing a beam cycle is further based on the channel information.

4. The method of claim 3, wherein computing a beam cycle comprises:
   quantizing information based on the transmissions into a number of beams; and
   determining the beam cycle based on the quantized information.

5. The method of claim 2, wherein the transmissions are sounding signals.

6. The method of claim 2, wherein the channel information comprises a direction of arrival.

7. The method of claim 2, further comprising transmitting a common reference sequence, wherein the common reference sequence is used by the plurality of mobile devices to compute resource-specific channel quality indicators.

8. The method of claim 7, wherein the resource-specific channel quality indicators computed by the plurality of mobile devices are not averaged by the plurality of mobile devices or are averaged over similar resources by the plurality of mobile devices.

9. The method of claim 2, further comprising transmitting a precoded common reference sequence.

10. The method of claim 2, further comprising adjusting the resource-specific channel quality measurement.

11. The method of claim 1, further comprising transmitting an unprecoded common reference sequence, wherein the unprecoded common reference sequence is used by the plurality of mobile devices to select a preferred precoder and to compute resource-specific channel quality indicators.

12. The method of claim 11, wherein the common reference sequence is transmitted on all antenna ports.

13. The method of claim 11, wherein the computing a beam cycle comprises:
    receiving a precoding matrix indicator from each of the mobile devices in the plurality of mobile devices;
    computing statistical information from the precoding matrix indicators; and
    determining the beam cycle from the statistical information.

14. The method of claim 13, wherein the precoding matrix indicator from each of the mobile devices in the plurality of mobile devices comprises a specified number of preferred precoding matrix indicators from the mobile device.

15. The method of claim 11, further comprising adjusting the resource-specific channel quality indicators.

16. The method of claim 1, further comprising transmitting the beam cycle.

17. The method of claim 16, further comprising transmitting an unprecoded common reference sequence, wherein the unprecoded common reference sequence and the beam cycle are used by the plurality of mobile devices to compute resource-specific channel quality indicators.

18. The method of claim 1, further comprising receiving a response from the mobile device.

19. The method of claim 18, further comprising:
    scheduling a new transmission to the mobile device in response to determining that the response indicates that the mobile device successfully decoded the transmitted information; and
    scheduling a retransmission to the mobile device in response to determining that the response indicates that the mobile device did not successfully decode the transmitted information.

20. A method for transmitting information by a controller, the method comprising:
    receiving feedback information from mobile devices in a plurality of mobile devices served by the controller;

computing a beam cycle based on the feedback information;

computing a utility function for each mobile device in the plurality of mobile devices sending feedback information;

scheduling a transmission opportunity for a mobile device in the plurality of mobile devices, wherein the scheduling is based on the beam cycle, the feedback information, and the utility function; and transmitting information to the mobile device based on the scheduled transmission opportunity.

21. The method of claim 20, wherein computing the utility function is based on a beam correlation factor, a system load factor, a maximum allowed penalty, a measure of an amount of flashlight effect present, a probability for selecting a mobile device, or a combination thereof.

22. The method of claim 21, wherein the utility function is expressible as $$utility\_coordinated=utility\_uncoordinated/UE\_penalty,$$

and $$UE\_penalty=beam\_correlation\_factor*load\_factor*max\_penalty*var\_coefficient,$$

where beam_correlation_factor is a beam correlation factor, load_factor is a system load factor, max_penalty is a maximum allowed penalty, var_coefficient is a measure of an amount of flashlight effect present, UE_penalty is a penalty associated for selecting the mobile device, utility_coordinated is a utility function for coordinated beam switching, and utility_uncoordinated is a utility function for not using coordinated beam switching.

23. The method of claim 21, wherein the scheduling a transmission opportunity comprises:

determining if the utility function for the mobile device exceeds a threshold; and scheduling the transmission opportunity for the mobile device if the utility function exceeds the threshold, wherein the transmission opportunity is not scheduled for the mobile device if the utility function does not exceed the threshold.

24. The method of claim 21, wherein the utility function changes based on traffic load, a variance in reported feedback values, or a combination thereof.

25. The method of claim 20, wherein the feedback information comprises a preferred precoding matrix indicator, a resource-specific channel quality indicator, a representation of a channel between a mobile device and the controller, or a combination thereof, and wherein the computing a beam cycle is based on the preferred precoding matrix indicator.

26. The method of claim 20, wherein scheduling a transmission opportunity comprises scheduling the transmission opportunity for the mobile device to a beam that is in a beam group that also contains a beam corresponding to a preferred precoding matrix for the mobile device, and wherein the scheduling is based on a discretized utility function.

27. A method for transmitting information by a controller, the method comprising:

performing channel discovery with a plurality of communications devices served by the controller;

computing a beam cycle based on results of the channel discovery;

receiving resource-specific channel quality indicators from the plurality of communications devices;

scheduling a transmission opportunity for a communications device in the plurality of communications devices, wherein the scheduling is based on a selected coordinated beam switching technique, the beam cycle, and the resource-specific channel quality indicators; and transmitting information to the communications device based on the scheduled transmission opportunity.

28. The method of claim 27, further comprising:

adjusting the resource-specific channel quality information; and selecting a modulation and coding scheme.

29. The method of claim 27, wherein performing channel discovery comprises:

receiving a sounding signal from each communications device in the plurality of communications devices, and computing channel information from the sounding signals; or transmitting a precoded common reference sequence or an unprecoded common reference sequence, and receiving preferred channel information from each communications device in the plurality of communications devices.

30. The method of claim 29, wherein the preferred channel information from each communications device comprises a representation of a channel between the controller and the communications device, and wherein performing channel discovery further comprises selecting a codeword corresponding to the representation of the channel.

31. The method of claim 29, wherein the preferred channel information comprises a preferred precoding matrix indicator.

32. The method of claim 27, wherein the selected coordinated beam switching technique comprises a rigid coordinated beam switching technique, or a flexible coordinated beam switching technique.

33. The method of claim 27, further comprising transmitting a precoded common reference sequence or an unprecoded common reference sequence prior to the receiving resource-specific channel quality information.

* * * * *